US012503347B2

(12) United States Patent
Goetsch et al.

(10) Patent No.: US 12,503,347 B2
(45) Date of Patent: Dec. 23, 2025

(54) LIFT DEVICES FOR CONTAINERS

(71) Applicant: Daniel B. Goetsch, Lucerne Valley, CA (US)

(72) Inventors: Daniel B Goetsch, Upland, CA (US); Clint Griffith, Lucerne Valley, CA (US)

(73) Assignee: Daniel B. Goetsch, Lucerne Valley, CA (US)

( * ) Notice: Subject to any disclaimer, the term of this patent is extended or adjusted under 35 U.S.C. 154(b) by 0 days.

(21) Appl. No.: 19/210,301

(22) Filed: May 16, 2025

(65) Prior Publication Data

US 2025/0376363 A1 Dec. 11, 2025

Related U.S. Application Data

(60) Provisional application No. 63/658,554, filed on Jun. 11, 2024, provisional application No. 63/657,675, filed on Jun. 7, 2024.

(51) Int. Cl.
*B66F 9/18* (2006.01)
*B66F 11/04* (2006.01)

(52) U.S. Cl.
CPC ................ *B66F 9/18* (2013.01); *B66F 11/04* (2013.01)

(58) Field of Classification Search
CPC .... B66F 9/18; B66F 11/04; B66F 9/06; B66F 19/00; B66F 7/20; B66F 7/10; B66F 7/00; B66F 7/02; B66F 5/00; B66F 3/00; B66F 11/00; B60P 1/6445; B60P 1/34; B65D 90/143; B65D 90/14; E04G 2003/286; B66B 9/187; B66B 11/06; B66B 11/08
USPC ..... 254/45, 84, 426; 280/43.23, 43.2, 43.21, 280/43.22; 414/10; 182/141, 242, 900
See application file for complete search history.

(56) References Cited

U.S. PATENT DOCUMENTS 1,673,864 A * 6/1928 Chapman .................. B66F 7/02 187/213
3,139,266 A * 6/1964 Tew .......................... B66F 7/02 187/210
3,752,263 A * 8/1973 Thevenot .................. E04G 1/20 182/148
4,512,440 A * 4/1985 Bixby ..................... E06C 1/381 187/241
4,765,594 A * 8/1988 Riedl ....................... B66F 9/00 D34/28

(Continued)

*Primary Examiner* — Gregory W Adams
(74) *Attorney, Agent, or Firm* — Manuel de la Cerra

(57) ABSTRACT

Disclosed is a lift device for lifting a container. The device includes a mount insert constructed to insert into and lock with a corner mounting block on the container. A carriage/trolley is attached to the mount insert, and includes a frame that defines a passthrough, a plurality of guide wheels attached to the frame that extend into the passthrough, and a lower pulley attached to the frame. A carriage/trolley vertical member is disposed in the passthrough, and includes a bottom end that contacts the ground, as well as a first upper pulley and a second upper pulley positioned away from the bottom end. A winch with a cable lifts the carriage/trolley. The cable exits the winch, spools on the first upper pulley, spools on the lower pulley, spools on the second upper pulley and connects to a cable anchor. The guide wheels ride along the carriage/trolley vertical member during lifting.

20 Claims, 26 Drawing Sheets

(56) References Cited

U.S. PATENT DOCUMENTS

| | | | | | |
|---|---|---|---|---|---|
| 5,800,114 | A * | 9/1998 | Secondi | B66F 3/46 | 410/82 |
| 6,490,906 | B1 * | 12/2002 | Bailey | B25H 1/0007 | 72/457 |
| 7,044,269 | B2 * | 5/2006 | Azran | E04F 21/12 | 182/129 |
| 7,281,736 | B2 * | 10/2007 | Sannah | B66F 17/006 | 182/69.6 |
| 10,781,089 | B2 * | 9/2020 | Finkbeiner | B66F 7/04 | |
| 11,046,515 | B2 * | 6/2021 | Luckinbill | B66F 3/46 | |

* cited by examiner (Active Lifting/Tight Cable Configuration)

(Lifting Ceased, Unexpected Cable Break/Slack Cable Configuration)

LIFT DEVICES FOR CONTAINERS

CROSS-REFERENCE TO RELATED APPLICATIONS

This application claims priority to U.S. Application 63/657,675, titled Lift Devices for Containers, filed on Jun. 7, 2024 and to U.S. Application 63/658,554, titled Lift Devices for Containers, filed on Jun. 11, 2024. Both applications are incorporated herein by reference in their entireties.

This application is also related to U.S. application Ser. No. 18/367,237, titled Lift Devices for Containers, filed on Sep. 12, 2023, which claims priority as a continuation of U.S. application Ser. No. 18/129,818, titled Lift Devices for Containers, filed on Mar. 31, 2023 (now U.S. Pat. No. 11,752,814 issued on Sep. 12, 2023), which claims priority to provisional application 63/327,871, titled Lift Devices for Container, filed on Apr. 6, 2022, to U.S. provisional application 63/335,355, titled Lift Devices for Container, filed on Apr. 27, 2022, to U.S. provisional application 63/354,826, titled Lift Devices for Container, filed on Jun. 23, 2022, to U.S. provisional application 63/357,896, titled Lift Devices for Container, filed on Jul. 1, 2022, and to U.S. application Ser. No. 17/237,883, titled Swing Caster Dolly, filed on Apr. 22, 2021. All these applications are incorporated herein by reference in their entireties.

FIELD OF THE INVENTION

This invention relates to devices used to lift cargo containers.

BACKGROUND OF THE INVENTION

Cargo shipping containers generally have four corner top container mounting blocks and four corner bottom container mounting blocks, each of which has two slot types. A top/bottom slot (1 per block) is a 3"×4" connector called a "Hammer" or a "TwistLock". This is the most common connector, as it enables the stacking of cargo shipping containers on top of one another on boats 10 high. The corner blocks also have side slots (2 per corner), which are 2"×3". These slots are primarily used to access the top/bottom slot but can also be used to connect to or mount to the corner mounting block of the cargo container with a "LUGS" connector that can be used to pick up and move the cargo shipping container.

Current state-of-the-art wheel dollies are simply not robust enough to lift the weight of a cargo container. Moreover, these dollies require their own hydraulic lift mechanism to ultimately raise heavy objects from the floor. For example, U.S. Pat. No. 3,653,527 discloses a wheel dolly with an integrated hydraulic jack used to raise the wheel. Likewise, U.S. Pat. No. 4,050,597 discloses a similar jack system. The problem with these integrated jack systems is that they are heavy because of the additional weight from the dedicated jack system. They are also expensive for the same reason.

Other wheel dollies use a threaded bolt system to create the lift needed to raise the object. For example, U.S. Pat. No. 7,597,524 discloses a parallelogram lift system with a bolt that is turned to raise the wheels. U.S. Pat. No. 7,232,138 teaches a long bolt that, when turned, brings two arms in contact with the object, and, as the bolt is further turned, the arms lift the wheel. These systems, too, have shortcomings. It can be very taxing to turn a bolt sufficiently to raise an object that weighs several tons. Also, it can be unsafe to require a user to be so close to the object dolly with manual tools when lifting. Wheel dollies can fail for a variety of reasons, and a user should not be close to the dolly when such a failure occurs.

To meet these deficiencies, the art has turned to massive cranes, hoists, and specialized heavy jacks. These solutions are expensive, heavy, and complicated.

What are therefore needed are devices that overcome these deficiencies and allow for both lifting and easy movement of cargo shipping containers.

SUMMARY OF THE INVENTION

Disclosed herein is a lift device for lifting a container. The device includes a mount insert constructed to insert into and lock with a corner mounting block on the container. A carriage/trolley is attached to the mount insert, and includes: a frame that defines a passthrough, multiple guide wheels attached to the frame that extend into the passthrough, and a lower pulley attached to the frame. A carriage/trolley vertical member is disposed in the passthrough, and includes a bottom end that contacts the ground and contacts a first upper pulley and a second upper pulley positioned away from the bottom end. A winch with a cable lifts the carriage/trolley. The cable exits the winch, spools on the first upper pulley, spools on the lower pulley, spools on the second upper pulley and connects to a cable anchor. The guide wheels ride along the carriage/trolley vertical member during lifting.

The carriage/trolley vertical member may have a cross-section with multiple vertices, and each guide wheel rides along a vertex. The guide wheels may have a groove, and the vertex is disposed in the groove. The first and/or second upper pulleys may be a plurality of pulleys. To increase stability, the bottom end of the carriage/trolley vertical member may have a flange or a plate. To prevent the container from inadvertently lowering, the carriage/trolley vertical member may also have a plurality of retention structures (such as a hole, a divot or a bump) that receive a safety pin.

The device may have a winch mounting plate for supporting the winch, and that plate may be in a fixed position relative to the carriage/trolley. The winch may have a remote control to operate the winch.

The cable anchor may also be in a fixed position relative to the carriage/trolley.

To power the winch, the lift device may have a battery, which may also be in a fixed position relative to the carriage/trolley.

The device may also have a vertical stabilization guide member attached to the container. A pulley member bracket slidably attaches the carriage/trolley vertical member to the vertical stabilization guide member.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1A:
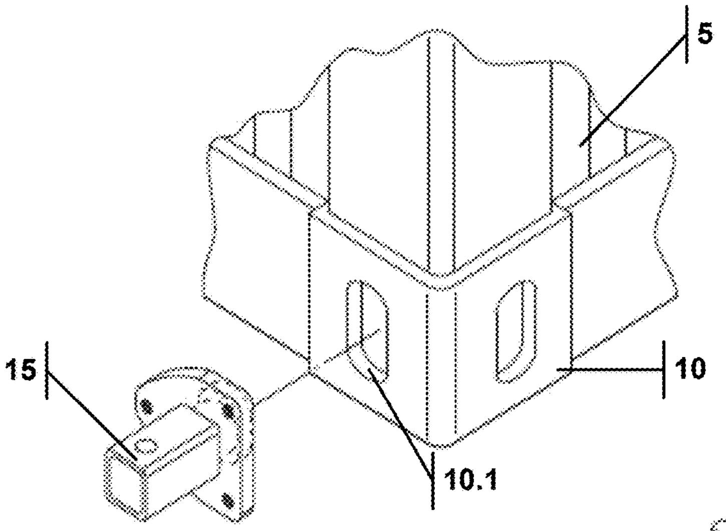
FIG. 1A illustrates the initial alignment of the cam lug relative to the bottom container mounting block of a container.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention, as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

2 Lift Device
5 Container
10 Container Corner Mounting Block
10.1 Corner Block Slot
15 Mount Insert/Cam Lug
15.1 Mount Insert Locking Rotation
15.2 Set Screw
20 Carriage/Trolley
20.1 Carriage/Trolley Frame
20.2 Passthrough
20.3 Guide Wheels
20.4 Wheel Groove
20.5 Trolley Mount
25 Vertical Stabilization Guide Member
25.1 Stabilization Guide Member Receiver
30 Stabilization Member Insertion
35 Carriage/Trolley vertical Member
35.1 Bottom End
35.2 Vertices
35.3 Ground Flange
35.4 Hole
35.5 Safety Pin
40 Pulley Member Insertion
45 Guide Member Bracket
50 Pulley Member Bracket
55 Winch Mount Plate
60 Mount Plate Insertion
65 Winch
70 Cable
75 First Upper Pulley Set
80 Lower Pulley
85 Second Upper Pulley Set
90 Cable Anchor
95 Battery Mount Plate
100 Battery Mount Plate Insertion
105 Battery
110 Power Cables
115 Winch Remote Control
120 Container Lift Distance
125 Truck
130 Truck Loading Movement
200 Emergency Brake Assembly
205 Pulley Bracket
208 Shroud
210 Spring
215 Spring Seat
215.1 Nut
220 Retention Shaft/Pin
230 Cotter Pin
235 Emergency Brake Pulley
240 Emergency Brake Pulley Movement
240.1 Emergency Brake Pulley Movement
245 Emergency Brake Pulley Movement Range
250 Retention Shaft/Pin Engagement Point
255 Tight Cable
260 Slack Cable The present invention discloses a lift device for use with shipping cargo containers. The lift device 2 comprises multiple components, including a mount insert 15, a carriage/trolley 20 attached to the mount insert 15, a carriage/trolley vertical member 35 disposed in the passthrough 20.2 of the carriage/trolley 20, a winch 65 comprising a cable 70, and pluralities of pulleys (75, 80, 85) and guide wheels 20.3, as well as other components. The individual components are described in sequential order of installation/use in FIGS. 1A-11D, and the operation of the entire lift device 2 is explained with FIGS. 12A-14B.

Figure 1B:
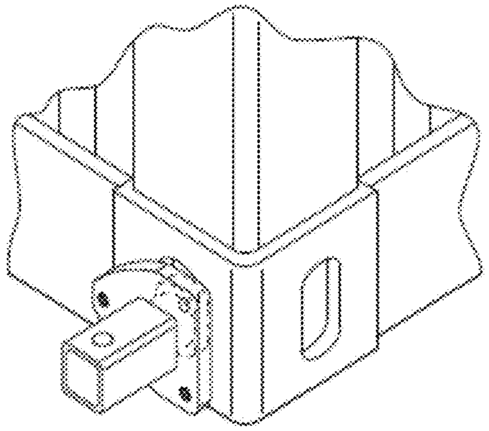
FIG. 1B illustrates the insertion of the cam lug into the bottom container mounting block of a container.
Figure 1C:
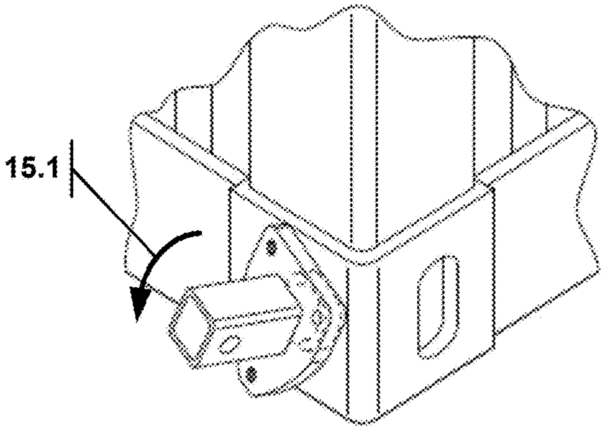
FIG. 1C illustrates the rotation of the cam lug while it is inserted into the bottom container mounting block of a container.
Figure 1D:
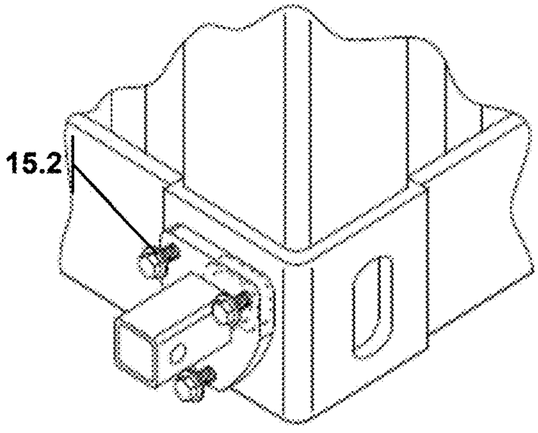
FIG. 1D illustrates attaching the set bolts to fix the cam lug more securely to the bottom container mounting block of a container.

FIGS. 1A-1D illustrate how the lift device 2 may attach to the container 5 via a mount insert 15, which has a portion with the same cross-section that inserts into the corner block slot 10.1 as a standard cam lug typically used with the container corner mounting block 10. In FIG. 1A, the mount insert/cam lug 15 is oriented in a direction to fit inside the corner block slot 10.1 of a bottom container corner mounting block 10. In FIG. 1B, the portion of the mount insert 15 that inserts into the container corner mounting block 10 is already inside the corner block slot 10.1. Subsequently, the mount insert may be locked into position via rotation, preferably approximately 90 degrees in the counterclockwise direction, as shown by the rotational arrow 15.1 representing the mount insert locking rotation. Finally, in FIG. 1D, set bolts 15.2 are applied to fix the mount insert/cam lug 15 more securely to the bottom container mounting block 10 of a container 5. The mount insert 15 is thus constructed to insert into and lock with the corner mounting block 10, such that it provides a secure mechanical connection and enables the container 5 to be lifted.

Figure 2A:
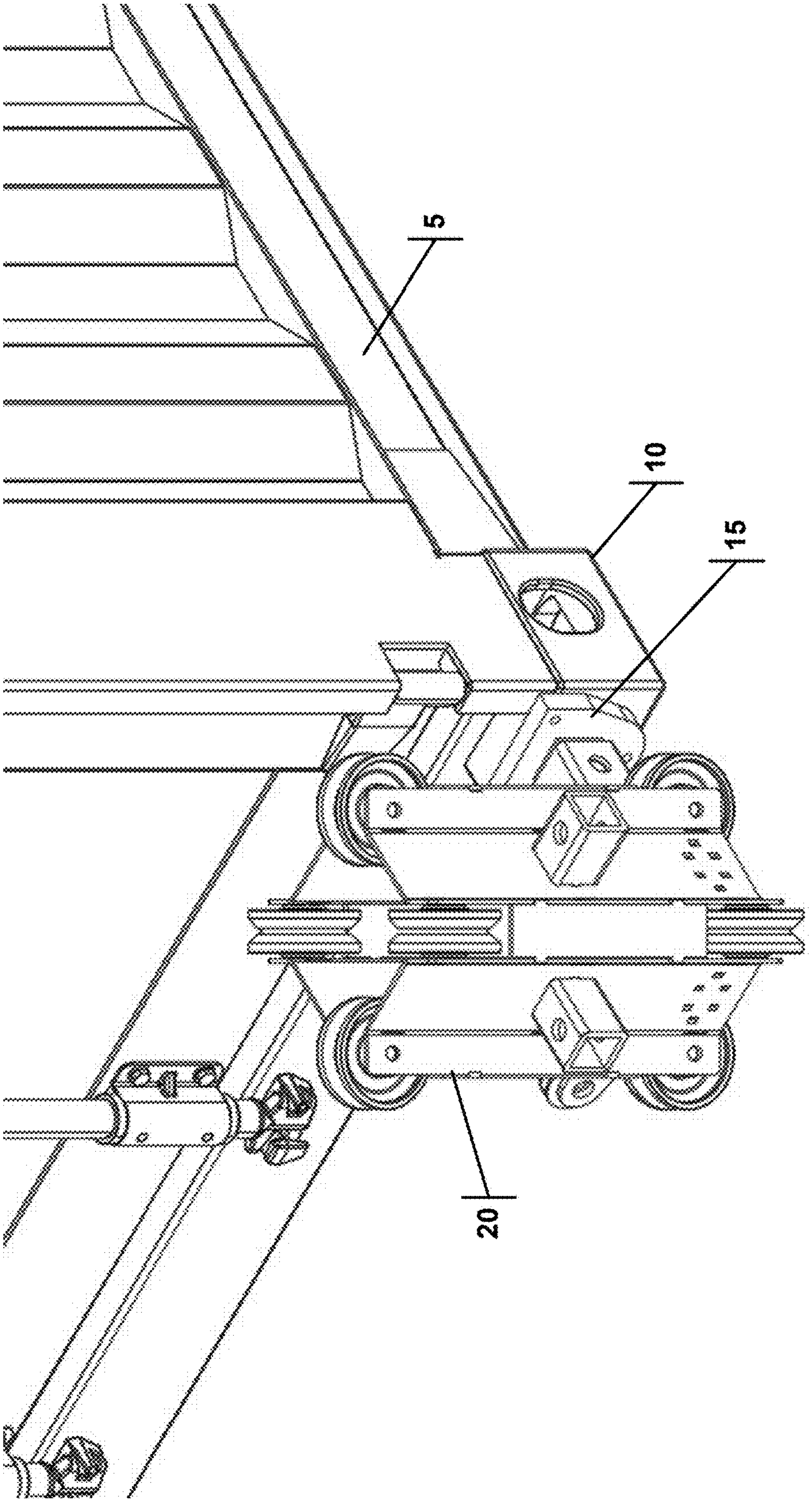
FIG. 2A illustrates the carriage/trolley mounted to the mount insert.
Figure 2C:
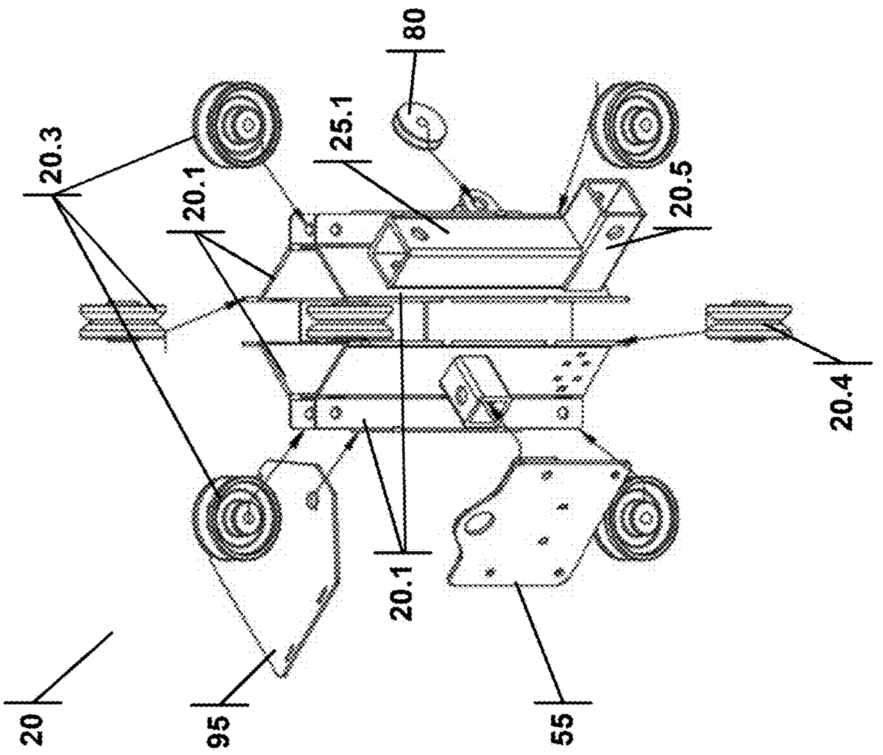
FIG. 2C is an exploded view of the various components of the carriage/trolley.
Figure 2B:
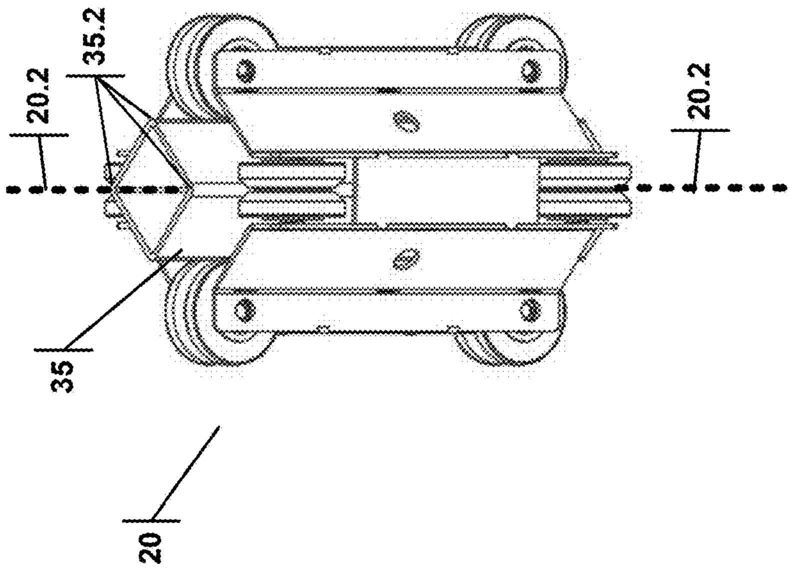
FIG. 2B illustrates the carriage/trolley.

In FIG. 2A, the mount insert/cam lug 15 has a carriage/trolley 20 mounted to it. This carriage/trolley 20 is shown in more detail in FIGS. 2B and 2C. In its assembled form (FIG. 2B), the carriage/trolley 20 has a frame 20.1 that defines a passthrough 20.2, demarcated by the vertices 35.2 of a carriage/trolley vertical member 35 disposed in the passthrough 20.2. In the exploded view (FIG. 2C), it may be seen that the carriage/trolley frame is assembled from multiple pieces, including guide wheels 20.3 each having a wheel groove 20.4 and attached to the rest of the carriage/trolley 20. There may be one or more trolley mounts 20.5 to attach other features, such as the lower pulley 80, the vertical stabilization guide member receiver 25.1, the winch mount plate 55, and the battery mount plate 95. In summary, the carriage/trolley 20 is attached to the mount insert 15 and comprises a frame 20.1 that defines a passthrough 20.2, a plurality of guide wheels 20.3 attached to the frame 20.1 that extend into the passthrough 20.2, and a lower pulley 80 attached to the frame. The carriage/trolley vertical member 35 has a cross-section with a plurality of vertices 35.2, illustrated in FIG. 2B, and each in the plurality of guide wheels 20.3 rides along each in the plurality of vertices 35.2. Additionally, each in the plurality of guide wheels 20.3 comprises a groove 20.4 (illustrated in FIG. 2C), and each in the plurality of vertices 35.2 is disposed in the groove 20.4.

Figure 3A:
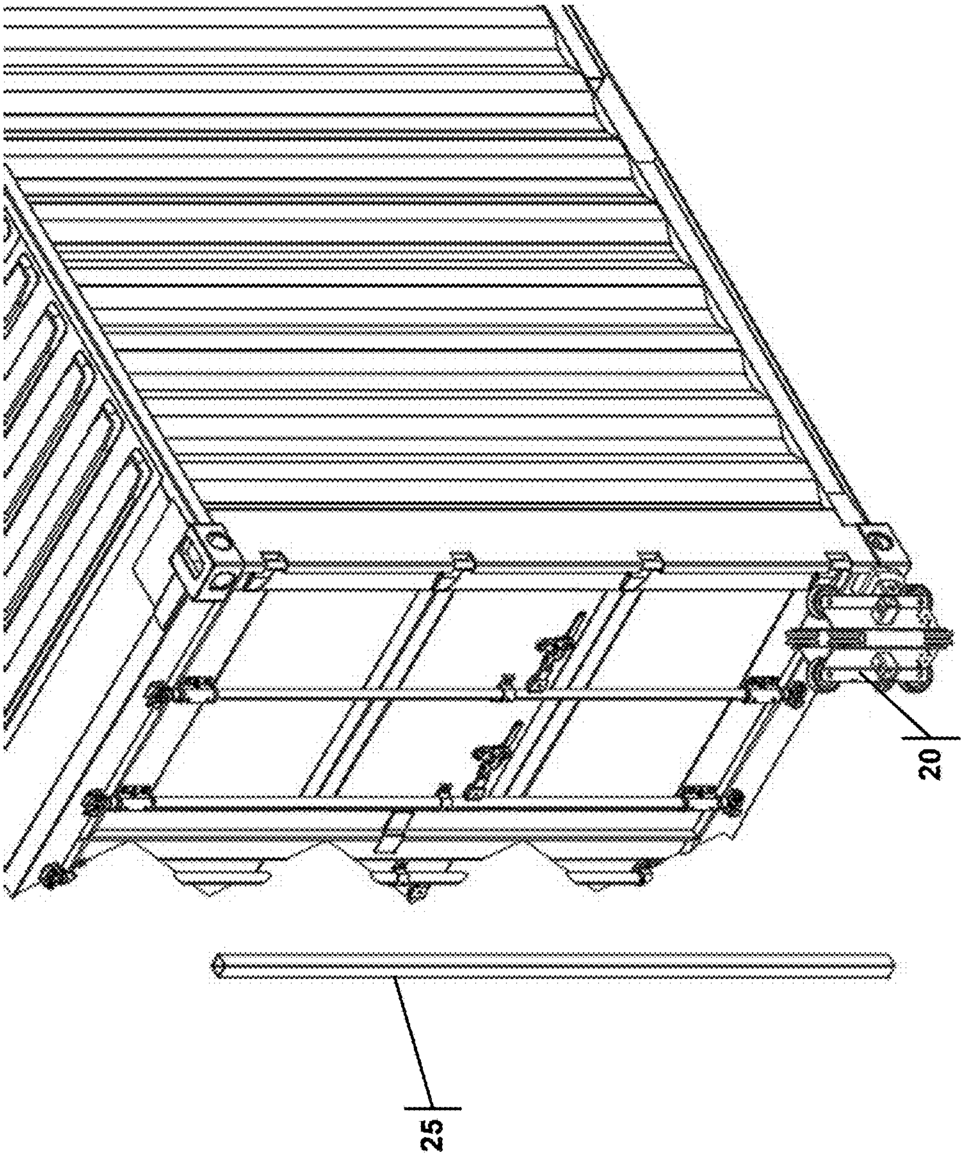
FIG. 3A illustrates the alignment of the vertical stabilization guide member relative to the container.
Figure 3B:
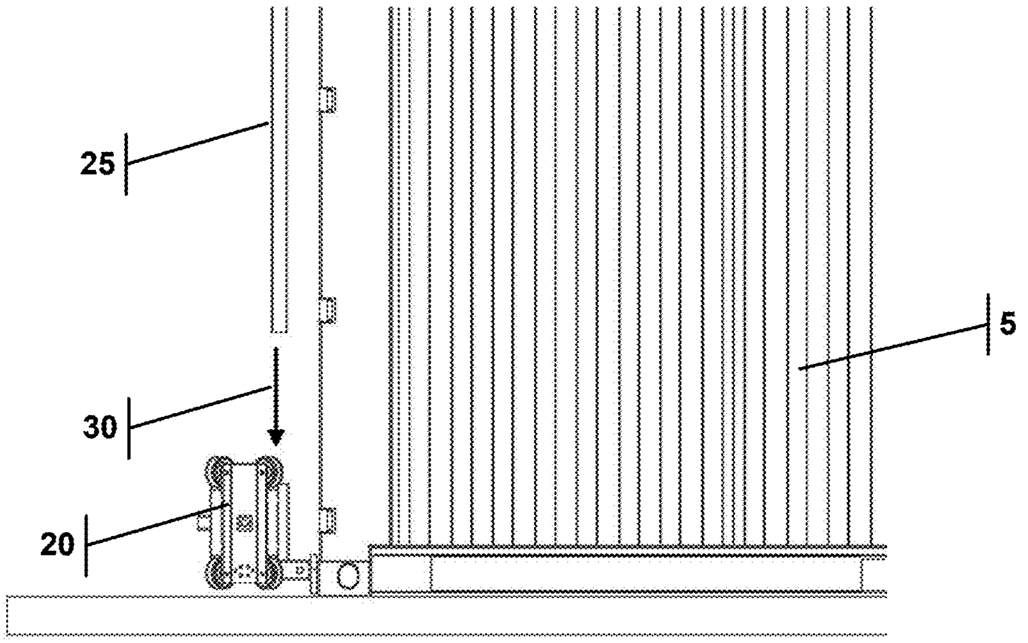
FIG. 3B illustrates the insertion of the vertical stabilization guide member into the stabilization guide member receiver on the carriage/trolley.
Figure 3C:
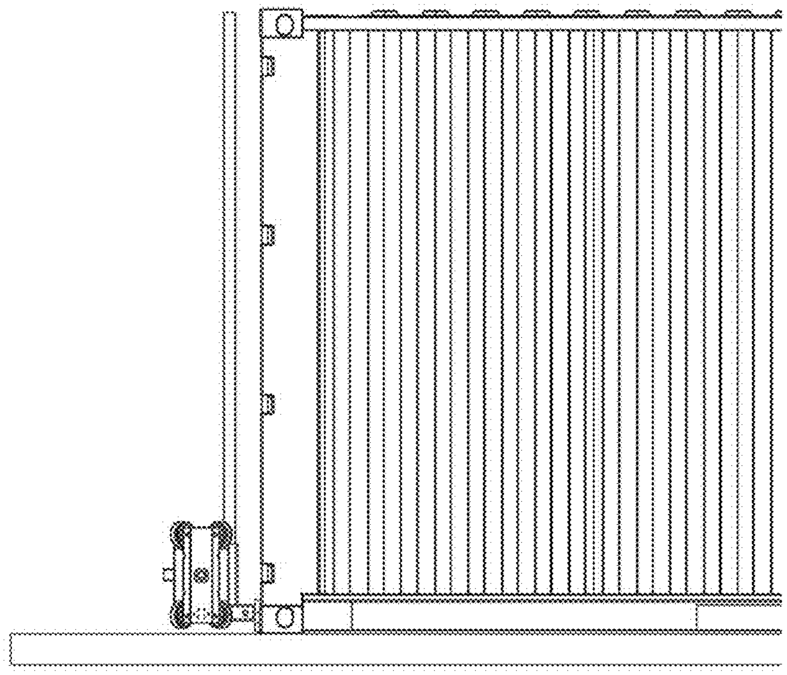
FIG. 3C illustrates the locking of the vertical stabilization guide member to the carriage/trolley.

Turning now to FIG. 3A, the (optional) vertical stabilization guide member 25 is briefly discussed. A salient feature of the present invention comprises a carriage/trolley vertical member 35 for the carriage/trolley 20 to ride along, using the plurality of guide wheels 20.3. Since the carriage/trolley 20 lifts the load from a bottom corner mounting block 10, it would be desirable to have the lift device 2 lift straight up and minimize any accidental tilting (that could lead to unintended torque at the contact point) caused by a misalignment of the system parts or operating forces. Therefore, the optional feature of having a vertical stabilization guide member 25 helps ensure that the container 5 is lifted straight up and down, with a lesser likelihood of tilting in an unintended direction as it is lifted. FIG. 3A shows the alignment of the vertical stabilization guide member 25, which is aligned in such a way that it is substantially vertical and parallel with the plane formed by a standing wall of the container 5. FIG. 3B then shows the insertion 30 of the vertical stabilization guide member 25 into a stabilization guide member receiver 25.1 (FIG. 2C) on the trolley/carriage 20 that is connected to the cargo container 5. When the vertical stabilization guide member 25 has been inserted and locked into place, shown in FIG. 3C, it is positioned substantially in parallel with the vertical wall of the container 5.

Figure 4A:
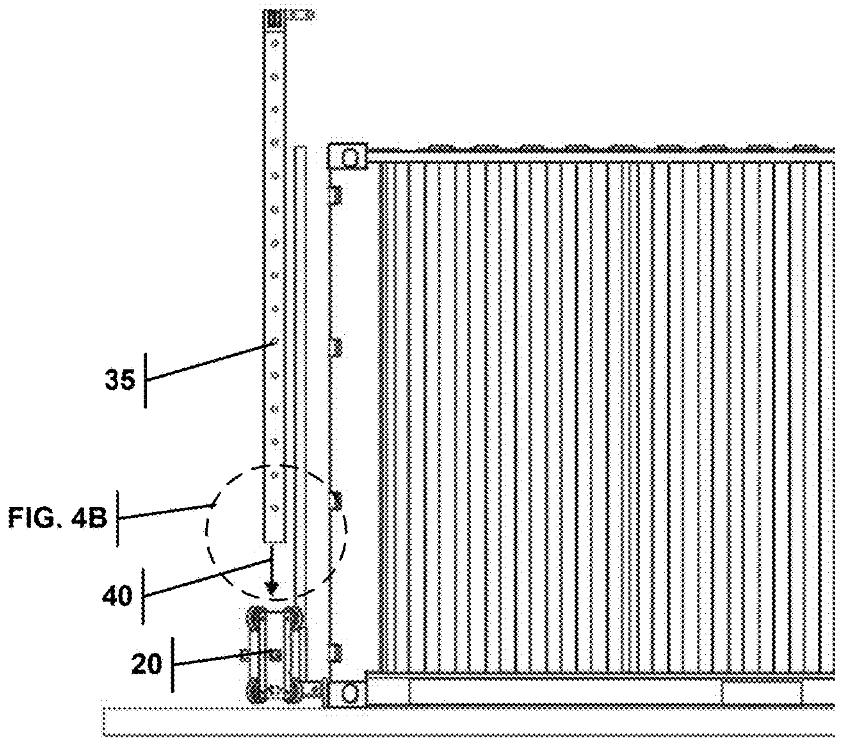
FIG. 4A illustrates the alignment of the carriage/trolley vertical member relative to the carriage/trolley.
Figure 4B:
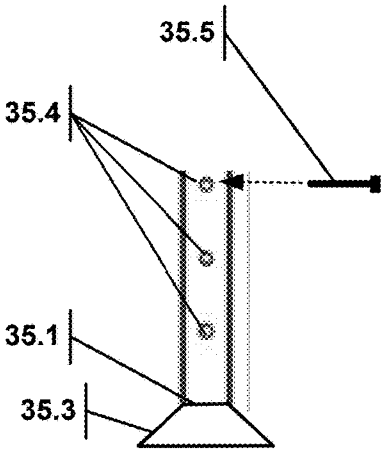
FIG. 4B illustrates the bottom end of the carriage/trolley vertical member with an optional ground flange.
Figure 4C:
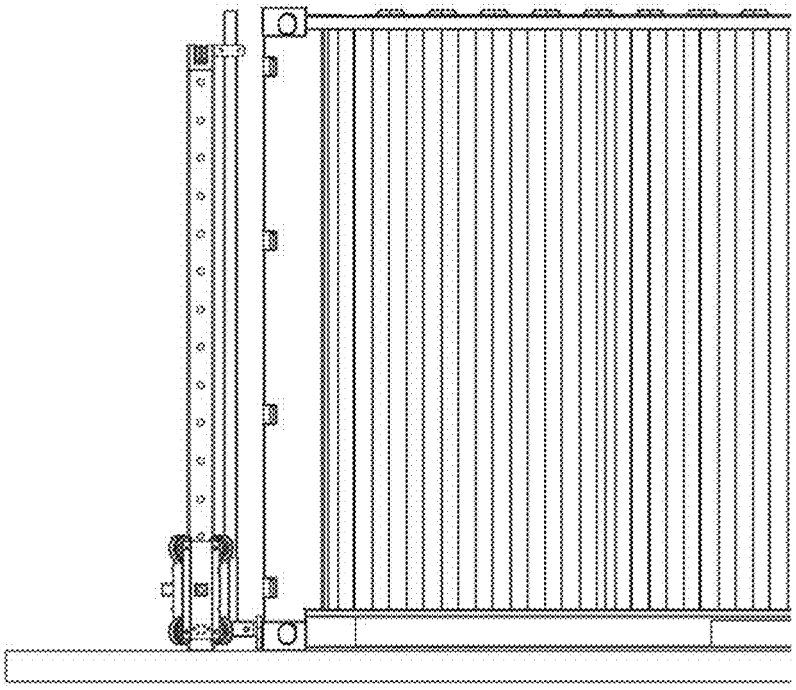
FIG. 4C illustrates the insertion of the carriage/trolley vertical member into the carriage/trolley.

In the order of installation, the mount insert or cam lug 15 is the first component to be connected to the container 5 and the container corner mounting block 10, then the carriage or trolley 20 is connected second, then the vertical stabilization guide member 25 is inserted and locked into place as a third step, albeit this system component is optional. Once the vertical stabilization guide member 25 is in place, the next step is to insert 40 the carriage/trolley vertical member 35 into the passthrough 20.2 of the carriage or trolley 20, as shown in FIGS. 4A (before) and 4C (after). FIG. 4B provides an enlarged view of the bottom end 35.1 of the carriage/trolley vertical member 35, which is constructed to contact the ground; FIG. 4B also illustrates optional features that enhance the stability and/or safety of the lift device 2, such as a ground flange 35.3 at the bottom end 35.1, and/or a plurality of retention structures 35.4 along the length of the carriage/trolley vertical member 35 (shown as holes) that are constructed to receive a safety pin 35.5. The retention structures 35.4 may also include, but are not limited to, divots, bumps, and notches).

Figure 10A:
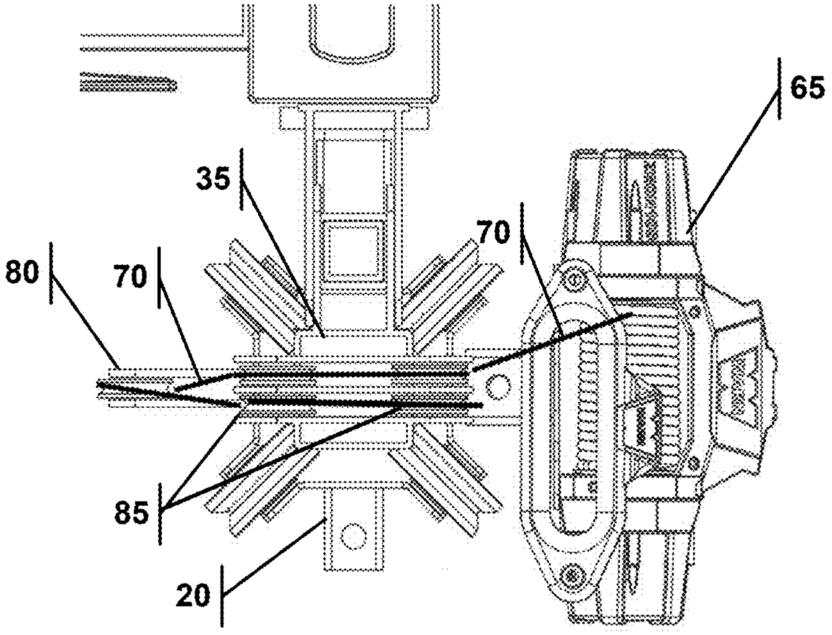
FIG. 10A is a plan view illustrating the winch cable travel about the second upper pulley set.
Figure 10B:
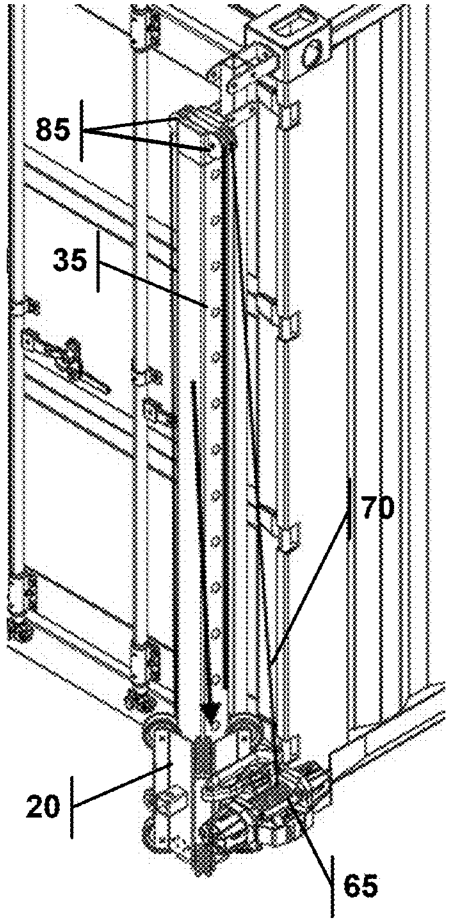
FIG. 10B is a side perspective view illustrating the downward direction of the winch cable from the second upper pulley set towards the cable anchor.

The carriage/trolley vertical member 35 is disposed in the passthrough 20.2 of the carriage/trolley 20 (see FIG. 2B) and comprises a bottom end 35.1 constructed to contact the ground (see FIG. 4B), a first upper pulley 75 positioned away from the bottom end 35.1 (see FIGS. 8A-8B), and a second upper pulley 85 positioned away from the bottom end 35.1 (see FIGS. 10A-10B).

Figure 5A:
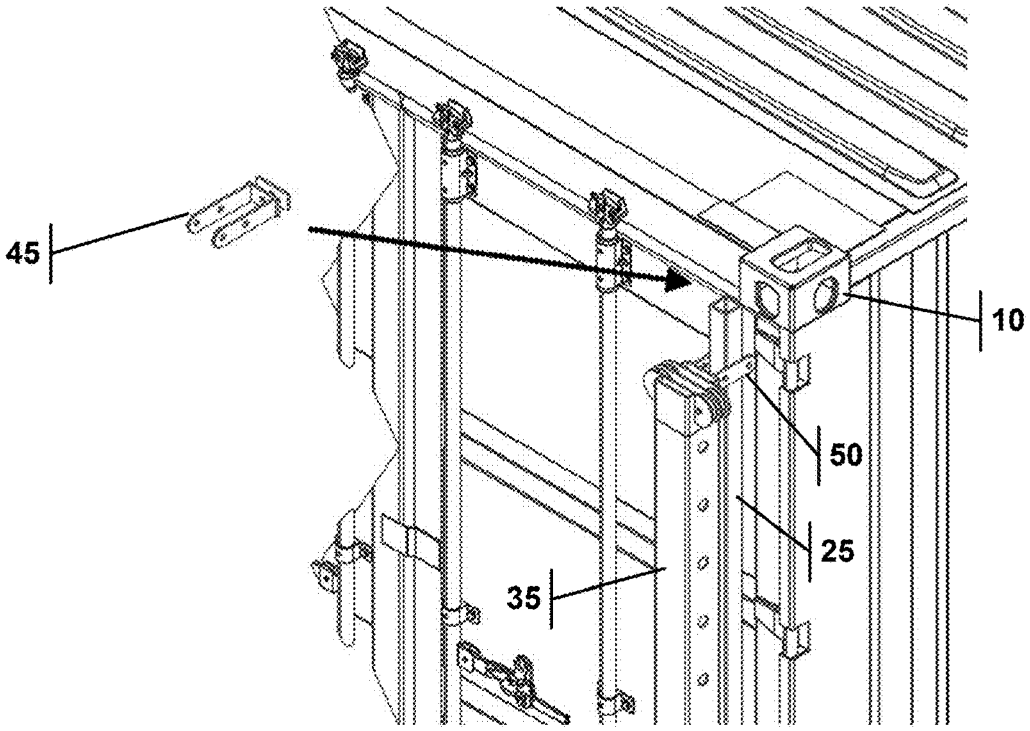
FIG. 5A illustrates the installation of the guide member bracket to the container.
Figure 5B:
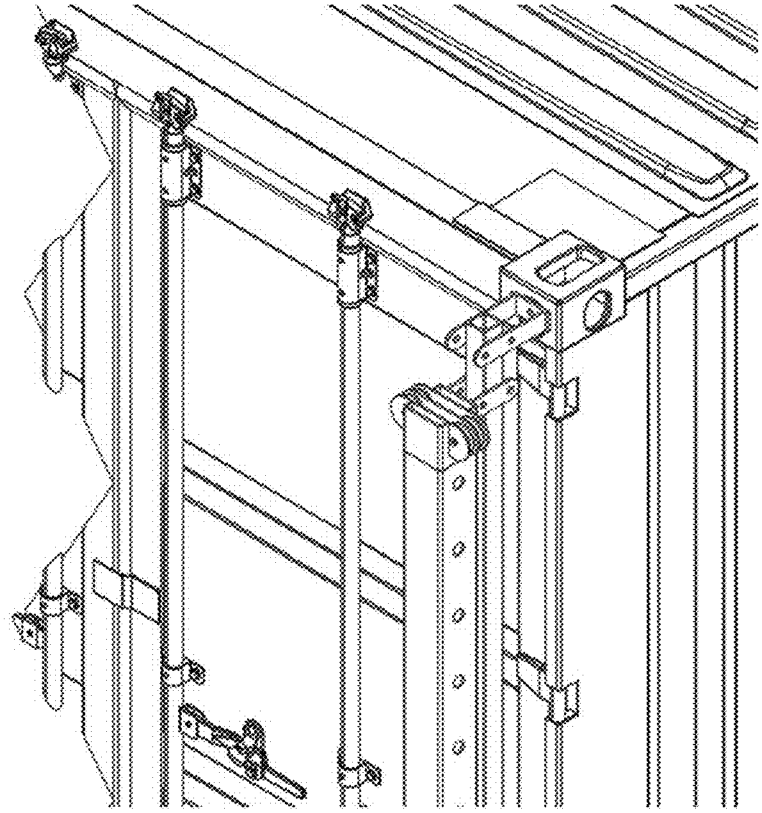
FIG. 5B illustrates the guide member bracket riding along the vertical stabilization guide member.

If using a vertical stabilization guide member 25, a guide member bracket 45 may be installed to connect the vertical stabilization guide member 25 to the container corner mounting block 10, and a pulley member bracket 50 may be used to connect the vertical stabilization guide member slidably and in alignment with the carriage/trolley vertical member 35, demonstrated in FIG. 5A. In FIG. 5B, the guide member bracket 45 rides along the vertical stabilization guide member 25 to attach it to the container 5, and the pulley member bracket 50 slidably attaches the carriage/trolley vertical member 35 to the vertical stabilization guide member 25.

Figure 6A:
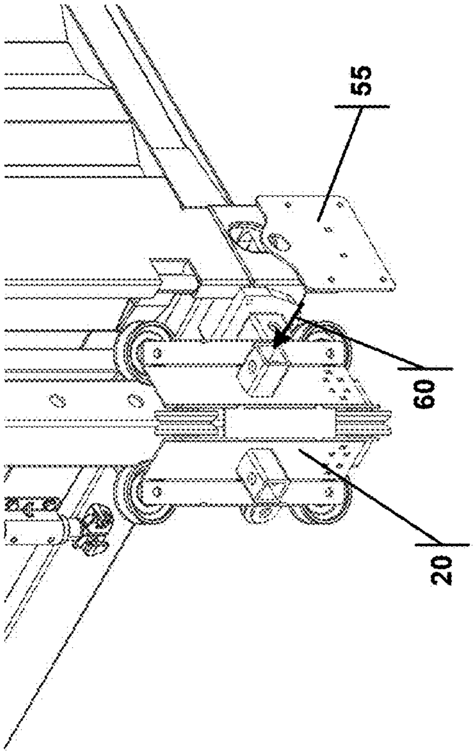
FIG. 6A illustrates the alignment of the winch mount plate relative to the carriage/trolley.
Figure 6B:
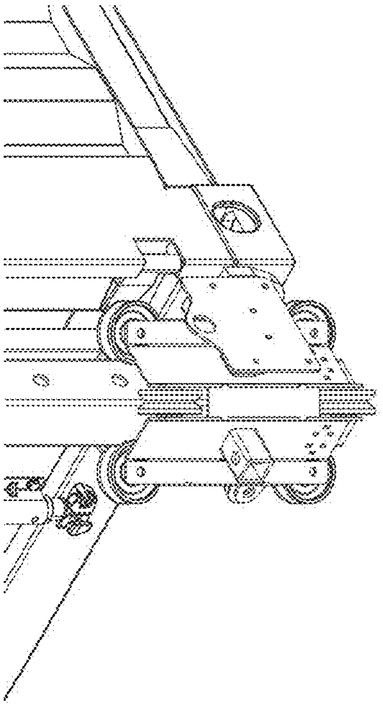
FIG. 6B illustrates the insertion of the winch mount plate into the carriage/trolley.
Figure 6C:
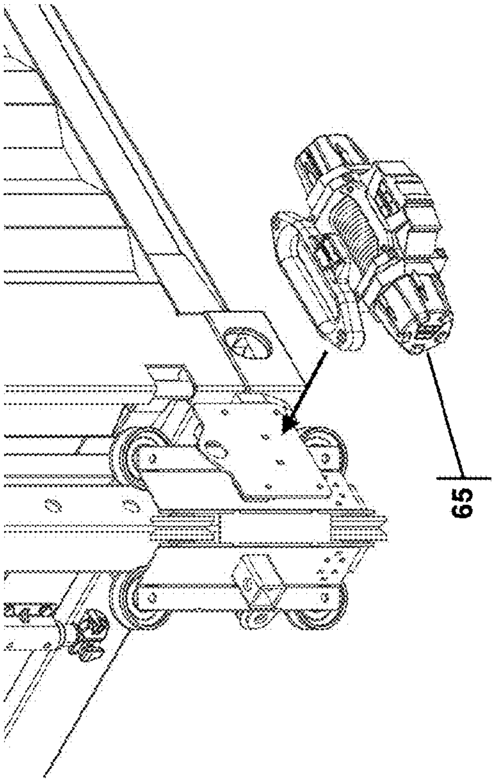
FIG. 6C illustrates the alignment of the winch relative to the winch mount plate.
Figure 6D:
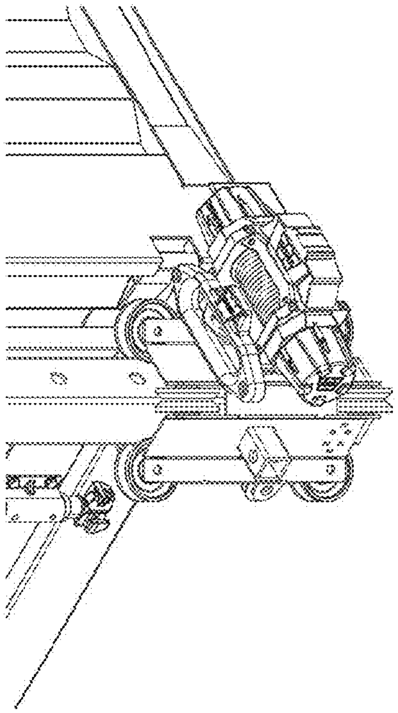
FIG. 6D illustrates the mounting of the winch onto the winch mount plate.

A winch mount plate 55 may be added to support a winch 65 and secure the winch 65 to the carriage or trolley 20, as shown in FIGS. 6A-6D. In these figures, the winch mounting plate 55 is in a fixed position relative to the carriage/trolley 20, although the winch mounting plate 55 need not be in a fixed position, and other possible configurations may be contemplated without departing from the scope and spirit of the present invention. In FIG. 6A, the alignment of the winch mount plate 55 prior to the mount plate insertion 60 is shown, and in FIG. 6B, the winch mount plate 55 has already been inserted into its corresponding spot on the carriage or trolley frame 20.1. Once the winch mount plate 55 has been securely connected to the carriage/trolley 20, such as with screws or bolts, FIG. 6C shows the alignment of the winch 65 relative to the winch mount plate 55. FIG. 6D illustrates the mounting of the winch 65 onto the winch mount plate 55. With the winch 65 connected to the carriage/trolley 20, the next step is to spool the cable 70 from the winch 65 up and down the carriage/trolley vertical member 35.

Figure 7A:
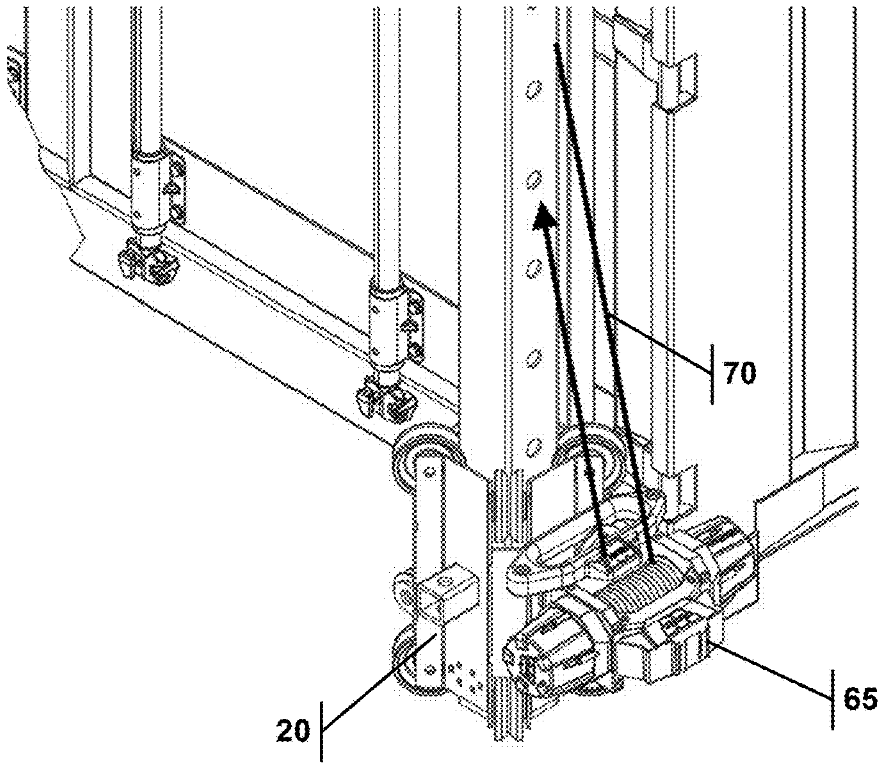
FIG. 7A illustrates the upward travel direction of the winch cable towards the first upper pulley set.
Figure 7B:
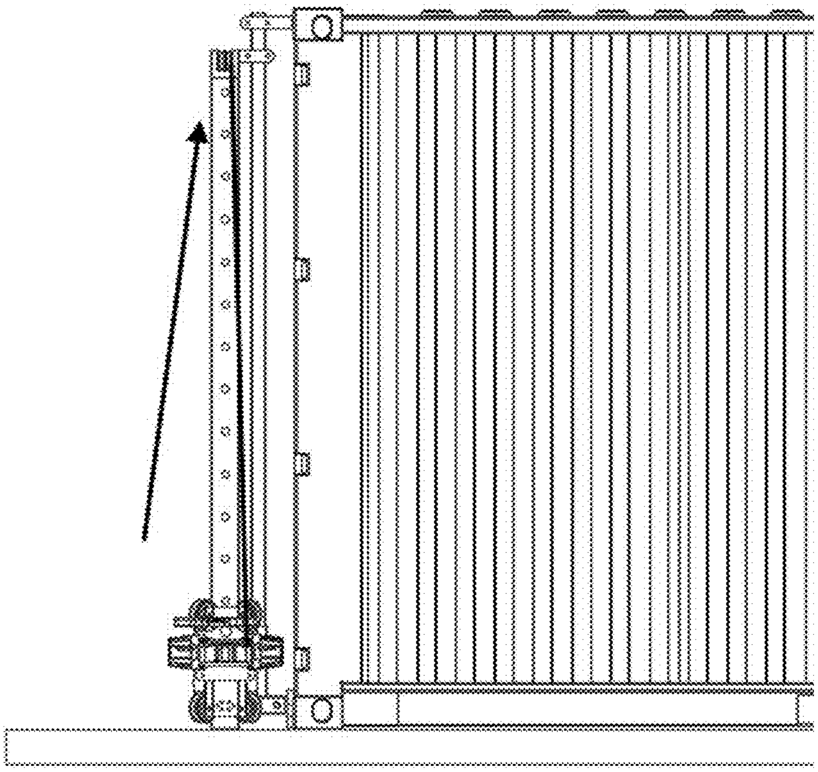
FIG. 7B is a side view illustrating the upward travel direction of the winch cable towards the first upper pulley set.
Figure 8A:
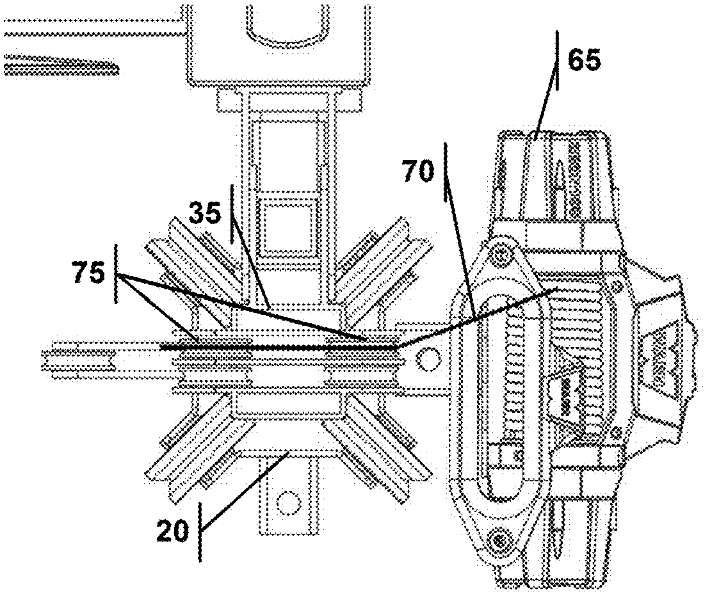
FIG. 8A is a plan view illustrating the winch cable travel about the first upper pulley set.
Figure 8B:
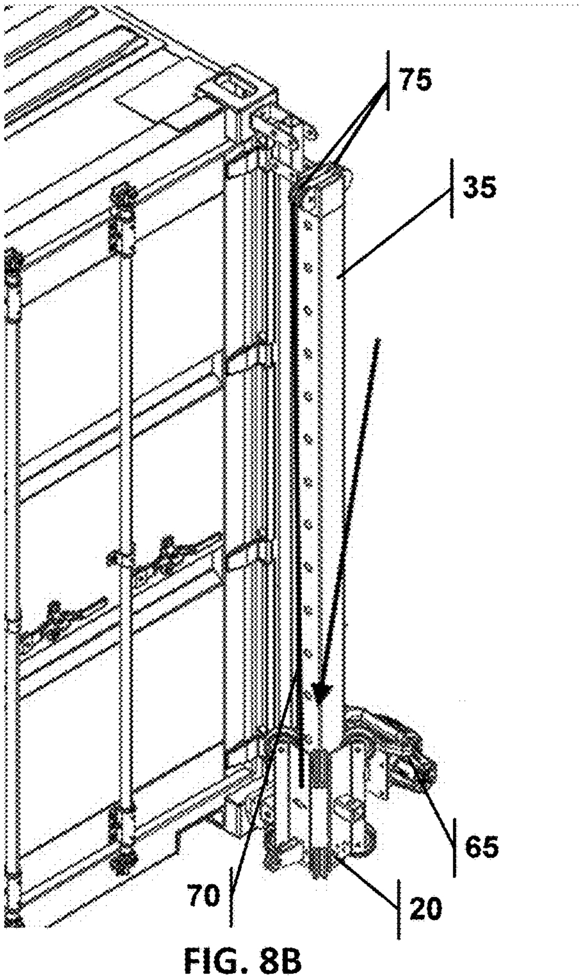
FIG. 8B is a side perspective view illustrating the downward direction of the winch cable from the first upper pulley set towards the lower pulley.

FIG. 7A illustrates the upward travel direction of the winch cable 70 from the winch 65 towards the first upper pulley set 75 (not pictured), and FIG. 7B provides the side view of the upward travel direction of the winch cable 70. In the plan or top view of FIG. 8A, the cable 70 travels from the winch 65 positioned at or near the bottom end 35.1 (not pictured) of the carriage/trolley vertical member 35 to the first upper pulley set 75 positioned away from the bottom end 35.1 (the same stretch of cable 70 seen in the side view of FIG. 7B can now be seen in the right-hand side of the top view of FIG. 8A). Irrespective of whether the word "set" is used or not with reference to element 75 (also called the first upper pulley 75), the first upper pulley 75 may comprise a single pulley or a plurality of pulleys. FIG. 8A shows the cable 70 exiting the winch 65 and spooling on the first upper pulley 75, located at or near the top of the carriage/trolley vertical member 35, therefore positioned away from the bottom end 35.1. From there, the cable 70 travels back down the carriage/trolley vertical member 35, which is shown in the side perspective view of FIG. 8B, to spool on the lower pulley 80 attached to the frame 20.1 of the carriage/trolley 20.

Figure 9A:
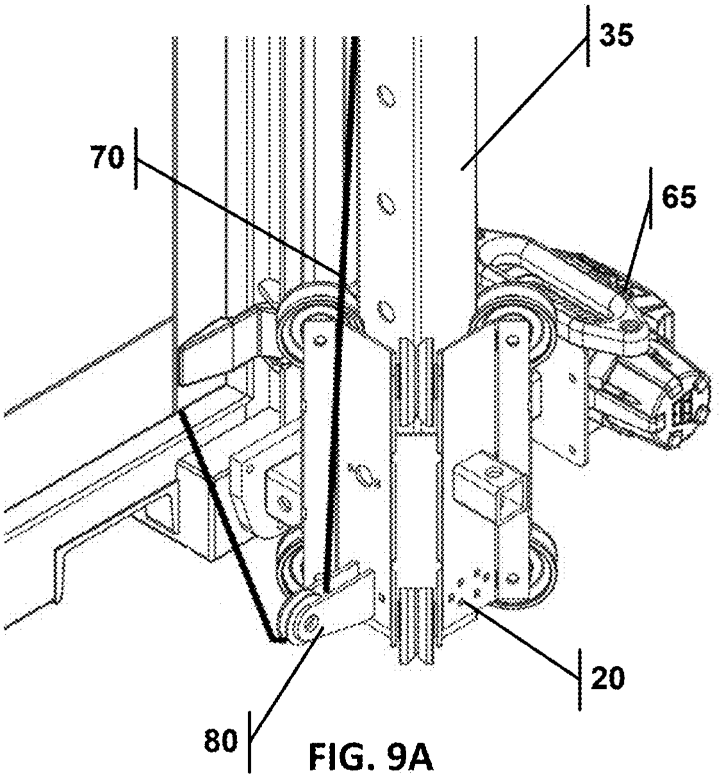
FIG. 9A is a side perspective view illustrating the winch cable travel about the lower pulley, and the subsequent upward travel towards the second upper pulley set.
Figure 9B:
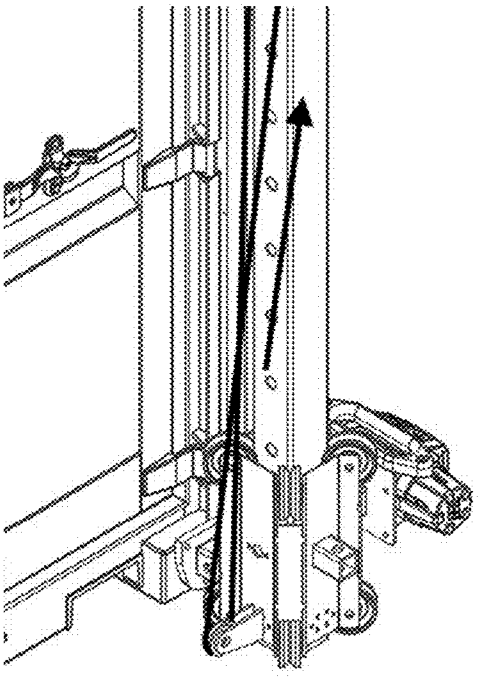
FIG. 9B is a more zoomed-out side perspective view showing the winch cable travel about the lower pulley with a subsequent upward travel towards the second upper pulley set.

The lower pulley 80 is illustrated in more detail in FIG. 9A, which also shows the subsequent travel of the cable 70 upward towards the second upper pulley set 85 (not pictured). FIG. 9B is a more zoomed-out, less enlarged side perspective view of the cable 70 coming down the carriage/trolley vertical member 35 from the first upper pulley 75, spooling on the lower pulley 80, and then exiting the lower pulley 80, traveling upward again away from the bottom end 35.1.

Figure 10C:
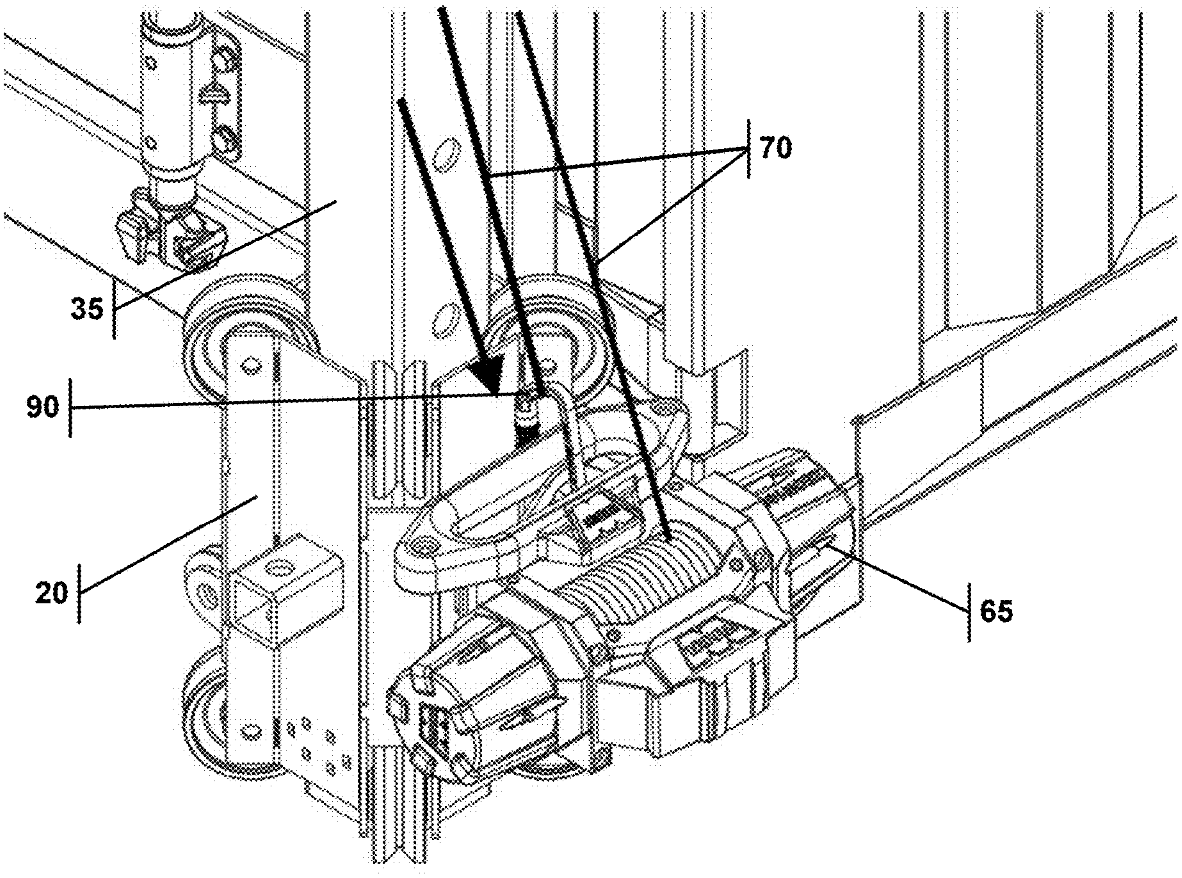
FIG. 10C is a side perspective view illustrating the winch cable connected to the cable anchor.

In FIGS. 10A and 10B, the second upper pulley set 85 is shown in the plan view and side perspective view, respectively. Irrespective of whether the word "set" is used or not with reference to element 85 (also called the second upper pulley 85), the second upper pulley 85 may comprise a single pulley or a plurality of pulleys. The second upper pulley 85 is located at or near the top of the carriage/trolley vertical member 35, and therefore positioned away from the bottom end 35.1. In FIGS. 10A-10C, one can follow the path of the winch cable 70, wherein the winch cable 70 exits the winch 65, spools on the first upper pulley 75, spools on the lower pulley 80, spools on the second upper pulley 85, and (after traveling from the second upper pulley 85 down to the cable anchor 90 in FIG. 10C) connects to a cable anchor 90. It should be noted that the cable anchor 90 may be in a fixed position relative to the carriage/trolley 20, just as it is illustrated in FIG. 10C, but variation embodiments (wherein the cable anchor 90 is not located on the carriage/trolley 20, but for instance attached to another object or to the ground, therefore not in a fixed position relative to the carriage/trolley 20 as it moves up and down the carriage/trolley vertical member 35) are possible without departing from the scope and spirit of the present invention.

Figure 11A:
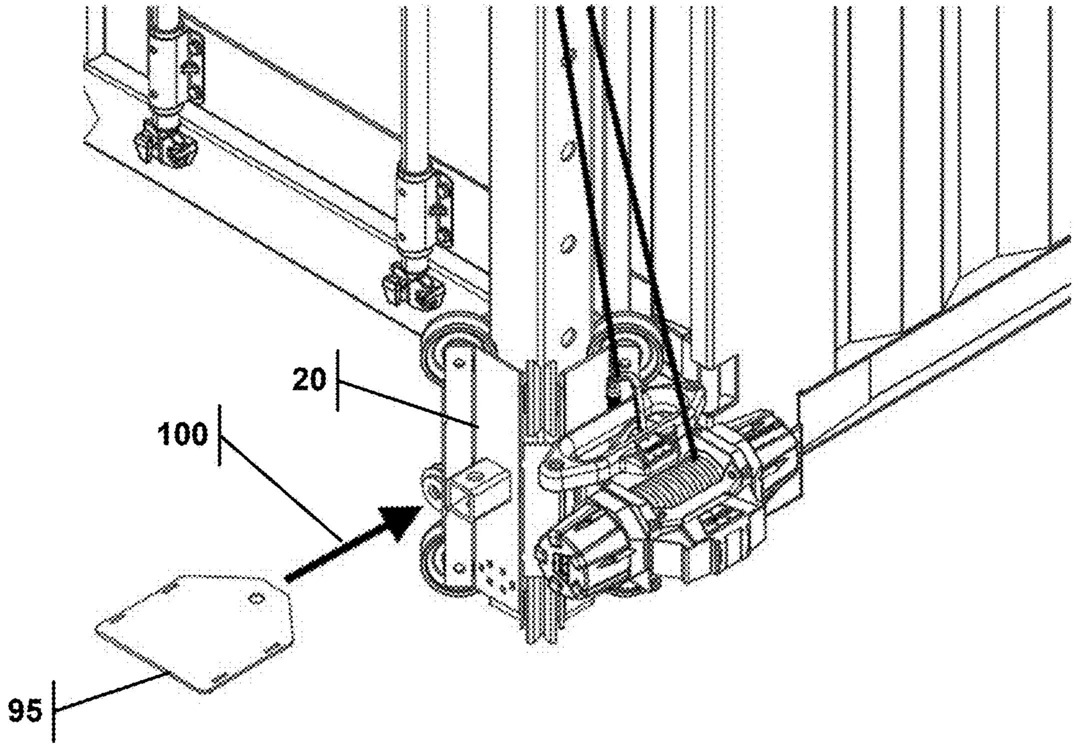
FIG. 11A illustrates the alignment of the battery mount plate relative to the carriage/trolley.
Figure 11B:
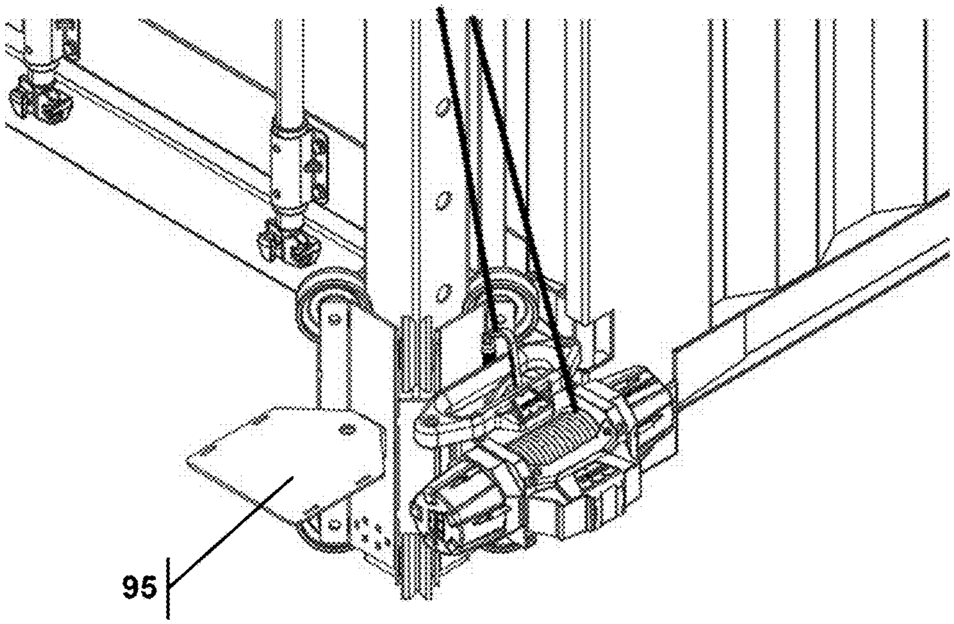
FIG. 11B illustrates the insertion of the battery mount plate into the carriage/trolley.
Figure 11C:
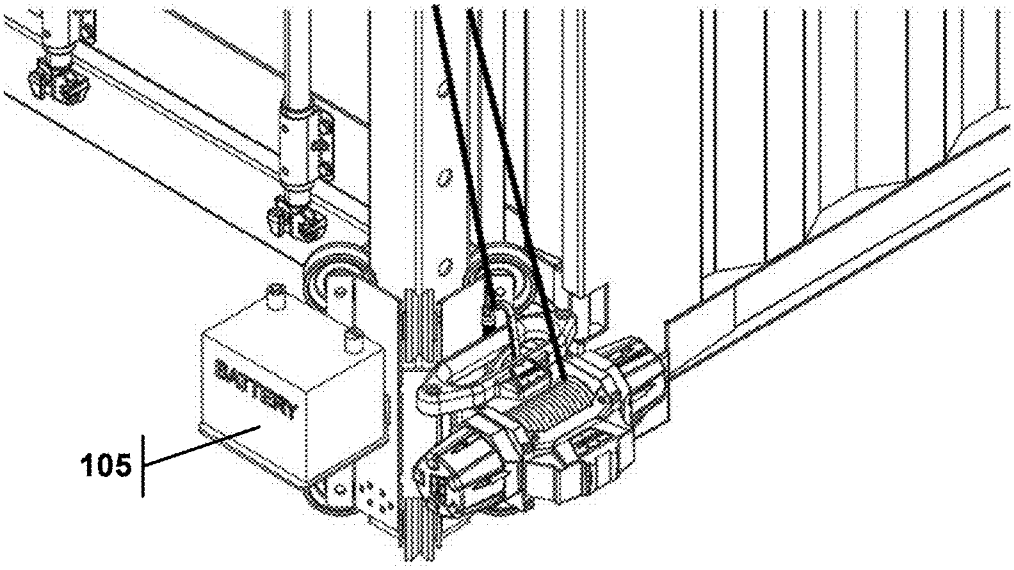
FIG. 11C illustrates the battery mounted to the battery mount plate.
Figure 11D:
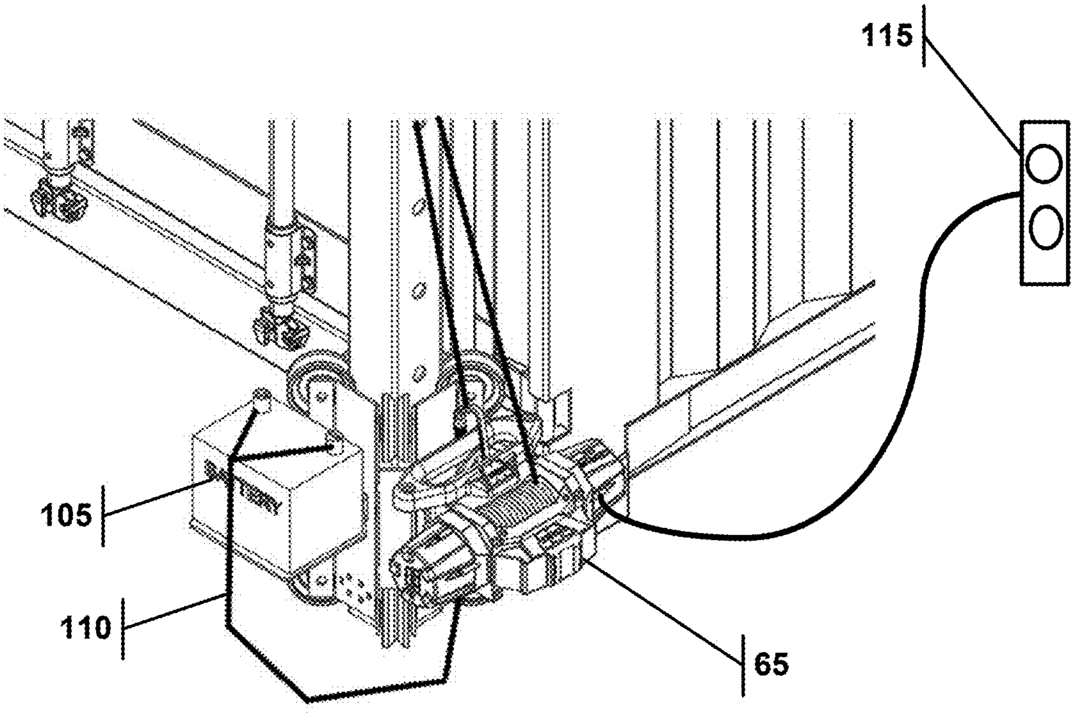
FIG. 11D illustrates the battery connected with power cables to power the winch, where the winch can be operated with a winch remote control.

Next, in FIGS. 11A-11D, the lift device 2 also discloses a battery mount plate 95 and a battery 105 to be used in conjunction with the carriage/trolley 20 and the winch 65. FIG. 11A shows the alignment of the battery mount plate 95 relative to the carriage/trolley 20, as it is being inserted 100 or installed onto the carriage/trolley 20. In FIG. 11B, the battery mount plate 95 has been inserted and is about to be fixed relative to the carriage/trolley 20, using a mechanical connection that may include, but is not limited to, set screws and bolts. In FIG. 11C, a battery 105 is mounted to the battery mount plate 95, and thus the battery 105 is securely connected to the carriage/trolley 20 via the battery mount plate 95, wherein the battery 105 is in a fixed position relative to the carriage/trolley 20. The battery 105 may be used to power the winch 65, and FIG. 11D shows the battery 105 connected to the winch 65 via the power cables 110. The winch 65 may also comprise a remote control 115, also shown in FIG. 11D. The winch remote control 115, which is connected to the winch 65 via either a wired connection, as illustrated, or via a wireless connection, which would be obvious to one of skill in the art without departing from the spirit and scope of the present invention. A lift device having a winch 65 that may be operated at a safe distance away using a winch remote control 115, and powered by a battery 105, provides a considerable improvement in ease of use and safety over the prior art based on hydraulics.

To reiterate, the lift device 2 disclosed by the present invention for lifting a cargo container 5 with a corner mounting block 10 is comprised of a mount insert 15, a carriage/trolley 20, a carriage/trolley vertical member 35, and a winch 65. The mount insert 15 is constructed to insert into and lock with the corner mounting block 10. The carriage/trolley 20 is attached to the mount insert 15 and itself comprises (at a minimum) a frame 20.1 that defines a passthrough 20.2, a plurality of guide wheels 20.3 attached to the frame 20.1 that extend into the passthrough 20.2, and a lower pulley 80 attached to the frame 20.1. The carriage/trolley vertical member 35 is disposed in the passthrough 20.2, and the carriage/trolley vertical member 35 comprises: a bottom end 35.1 constructed to contact the ground, a first upper pulley 75 positioned away from the bottom end 35.1, and a second upper pulley 85 positioned away from the bottom end 35.1. The winch 65 comprises a cable 70, wherein the cable 70 exits the winch, spools on the first upper pulley 75, spools on the lower pulley 80, spools on the second upper pulley 85, and connects to a cable anchor 90. In the lift device 2 disclosed, the plurality of guide wheels 20.3 ride along the carriage/trolley vertical member 35. In addition to these components and features, several features and options were described and discussed in conjunction with reference to FIGS. 1A-11D. Most of these additional features are presented in FIGS. 12A-12F, which also illustrate the operation of the lift device 2.

Figure 12A:
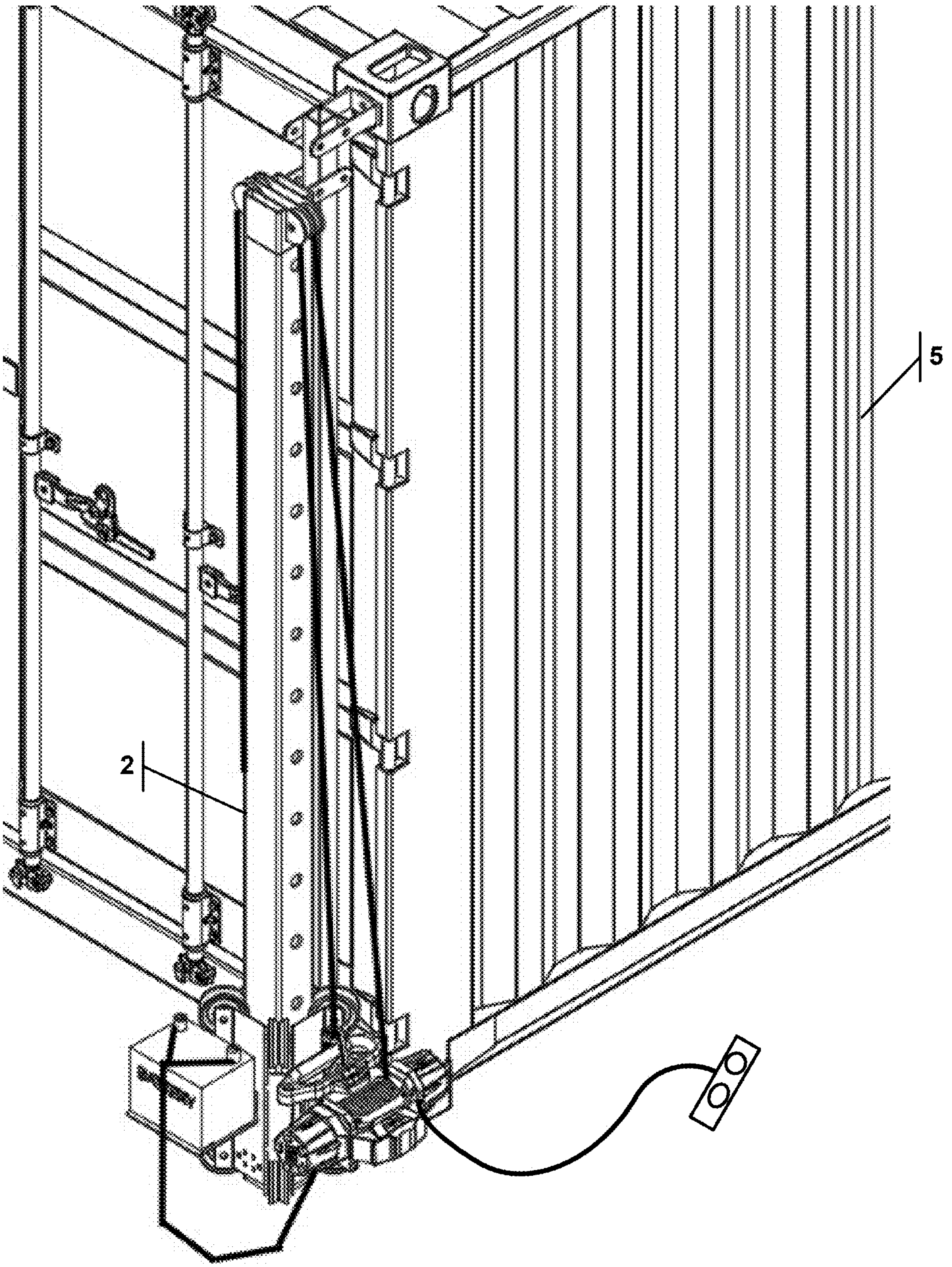
FIG. 12A is a perspective view illustrating the power cables and remote control connected to the winch.
Figure 12B:
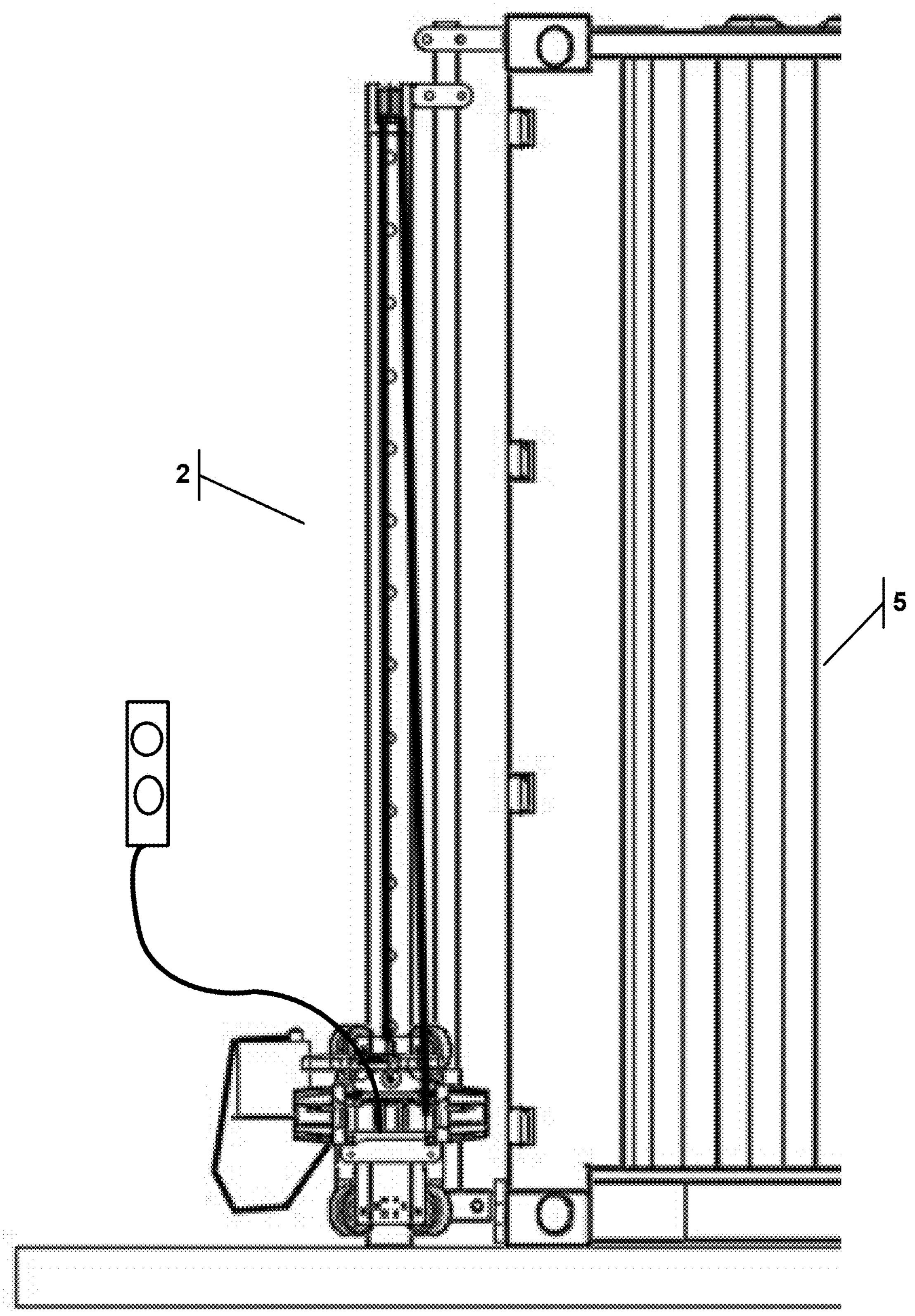
FIG. 12B is a side view illustrating the power cables and remote control connected to the winch.

FIG. 12A is a perspective view of the lift device 2 mounted to the container 5, including the options of the power cables and the remote control connected to the winch. FIG. 12B provides a side view of the system in its entirety, including the power cables and remote control. Here, a vertical stabilization guide member attached to the container 5 can be seen (attached on its top end with a guide member bracket to the top corner mounting block of the container, and attached to the trolley/carriage 20 on its bottom end, which in turn is connected to the bottom corner mounting block of the container). Also visible in FIG. 12B is a pulley member bracket that slidably attaches the carriage/trolley vertical member to the vertical stabilization guide member such that the vertical stabilization guide member may move vertically along with the container 5 as it is lifted (see FIGS. 12E, 12F), and the distance between the two brackets is not fixed.

Figure 12C:
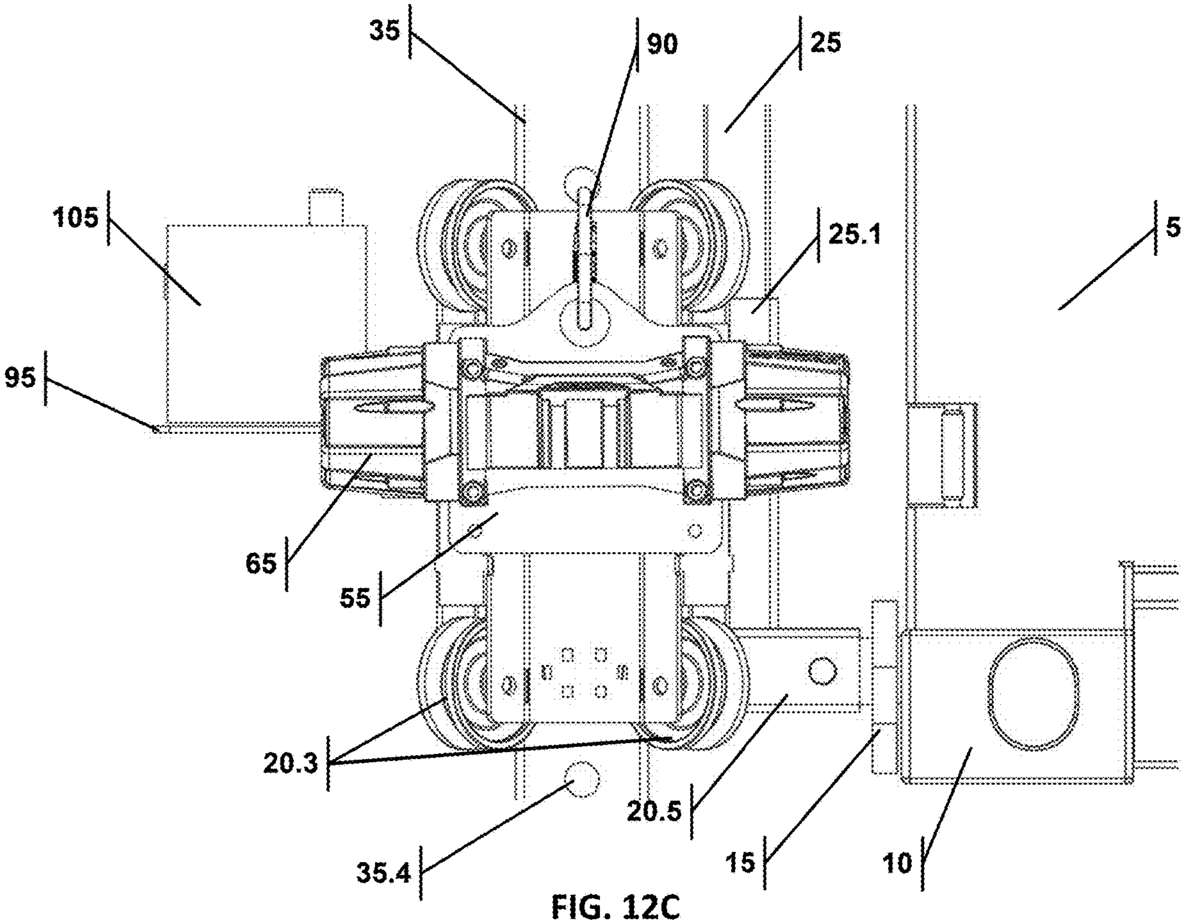
FIG. 12C is an enlarged side view of the device mounted to the container, detailing the carriage trolley.

FIG. 12C provides an enlarged side view of the lift device 2 mounted to the cargo container 5, detailing the components in and around the carriage/trolley 20. The cargo container 5 has a container corner mounting block 10 at a bottom corner of the container 5, and the mount insert 15 attaches securely to this container corner mounting block 10, as shown earlier in FIGS. 1A-1D. The mount insert 15 is connected to a trolley mount 20.5, which is connected to the carriage/trolley frame 20.1 and to the stabilization guide member receiver 25.1, which houses the vertical stabilization guide member 25. There is a carriage/trolley vertical member 35 disposed in the passthrough 20.2 of the carriage/trolley 20. The carriage/trolley vertical member 35 comprises retention structures 35.4, through which a pin may be inserted for safety, if desired. The carriage/trolley 20 also has guide wheels 20.3 that ride along the carriage/trolley vertical member 35, a winch mount plate 55 to which the winch 65 is mounted, a battery mount plate 95 to which a battery 105 is mounted, and a cable anchor 90.

Note that some parts of the invention are deliberately not shown in FIG. 12C, so as not to obfuscate the side view with needless details. Note also that in FIG. 12C, unlike in all the previous FIGS. 1A-12B, the carriage/trolley 20 is not positioned at the bottom end 35.1 of the carriage/trolley vertical member 35, but judging from the position of the hole 35.4 shown, is somewhere mid-lift, as in FIG. 12F. The lower pulley 80 is not visible in FIG. 12C, as it is on the other side of the carriage/trolley frame 20.1 and behind the winch 65. However, as the lower pulley 80 is attached to the frame 20.1 that moves along with the carriage/trolley 20, the lower pulley 80 may also be positioned away from the bottom end 35.1 of the carriage/trolley vertical member 35. Unlike the first and second upper pulleys (75, 85), which must be positioned away from the bottom end 35.1 of the carriage/trolley vertical member 35, the lower pulley 80 may or may not be positioned away from the bottom end 35.1, depending on the position of the carriage/trolley 20 as the carriage/trolley 20 rides along the carriage/trolley vertical member 35. The same condition may be true of the cable anchor 90, which (in the illustrated embodiment) is placed in a fixed position relative to the carriage/trolley 20, and thus may or may not be positioned away from the bottom end 35.1, depending on the position of the carriage/trolley 20.

Figure 12D:
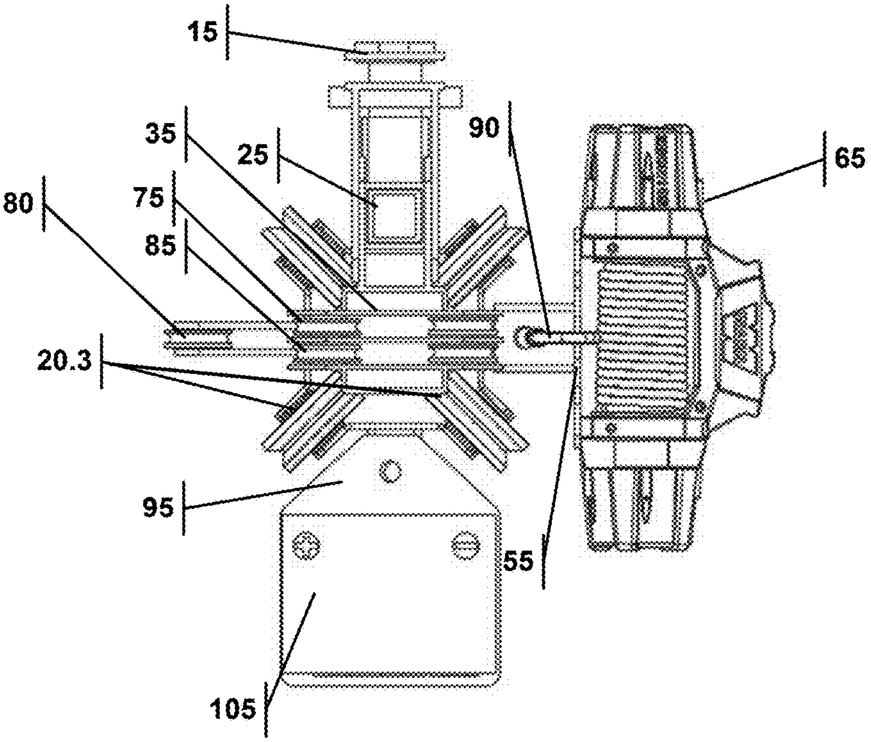
FIG. 12D is an enlarged plan view of the device, detailing the carriage trolley.

In the enlarged plan view of FIG. 12D, we see another perspective of the mount insert 15, the vertical stabilization guide member 25, the carriage/trolley vertical member 35, the guide wheels 20.3, the winch mount plate 55, the winch 65, the cable anchor 90, the battery mount plate 95, and the battery 105. What are now visible in FIG. 12D but not in FIG. 12C are the pulleys: the first upper pulley 75, the lower pulley 80 attached to the carriage/trolley 20, and the second upper pulley 85. Each of these numbered pulley elements may be comprised of a plurality of pulleys, instead of a singular pulley. The winch cable 70 is deliberately not shown in FIG. 12D to be able to see the details of the pulleys (75, 80, 85) and the guide wheels 20.3 more clearly. Here it is easier to see that the carriage/trolley vertical member 35 has a cross-section with a plurality of vertices, and each in the plurality of guide wheels 20.3 rides along each in the plurality of vertices. In FIG. 12D we see the cross-section of the carriage/trolley vertical member 35 as having four corners, which are its vertices. It should be understood and noted that, although the carriage/trolley vertical member 35 is shown as having a rectangular cross-section with four corners/vertices, other variations with a different number of vertices are possible and would be obvious to one of skill in the art. What is also readily visible in FIG. 12D is that each in the plurality of guide wheels 20.3 comprises a groove, and each in the plurality of vertices 35.2 is disposed in the groove. In other words, the guide wheels 20.3 enable the carriage/trolley 20 to ride along the carriage/trolley vertical member 35 by having wheel grooves that help the guide wheels 20.3 ride along the vertices/edges of the carriage/trolley vertical member 35.

Figure 12E:
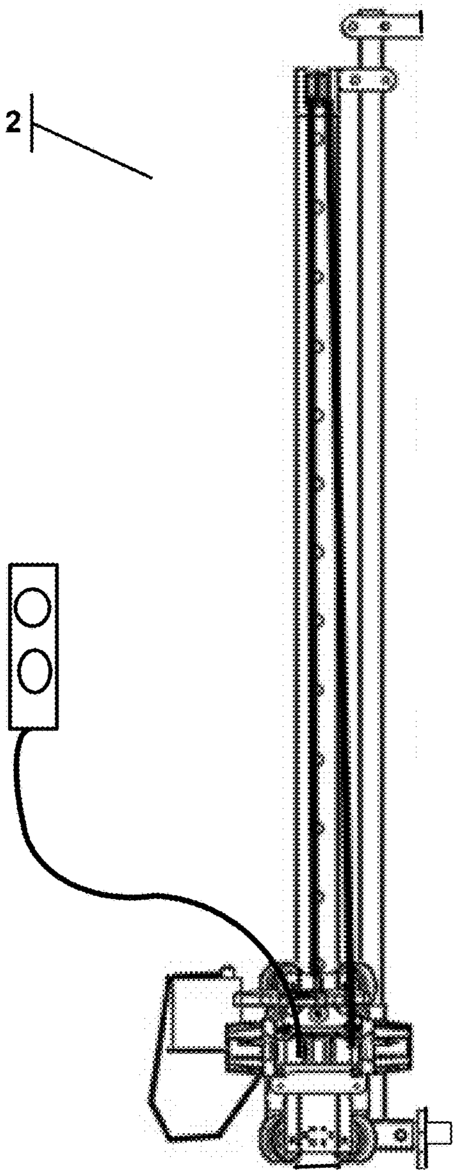
FIG. 12E is a side view of the lifting device, with the carriage/trolley at its bottom-most position.

FIG. 12E shows the carriage/trolley 20 at its bottom-most position at the bottom end of the carriage/trolley vertical member 35, where it is most likely positioned prior to lifting the container 5 attached via the mount insert 15. In both FIGS. 12E and 12F, the battery 105 is connected to the winch 65, as is the remote control 115. While operating the lift device 2, the carriage/trolley 20 moves from the bottom-most position up along the carriage/trolley vertical member 35, shown in FIG. 12F.

Figure 12F:
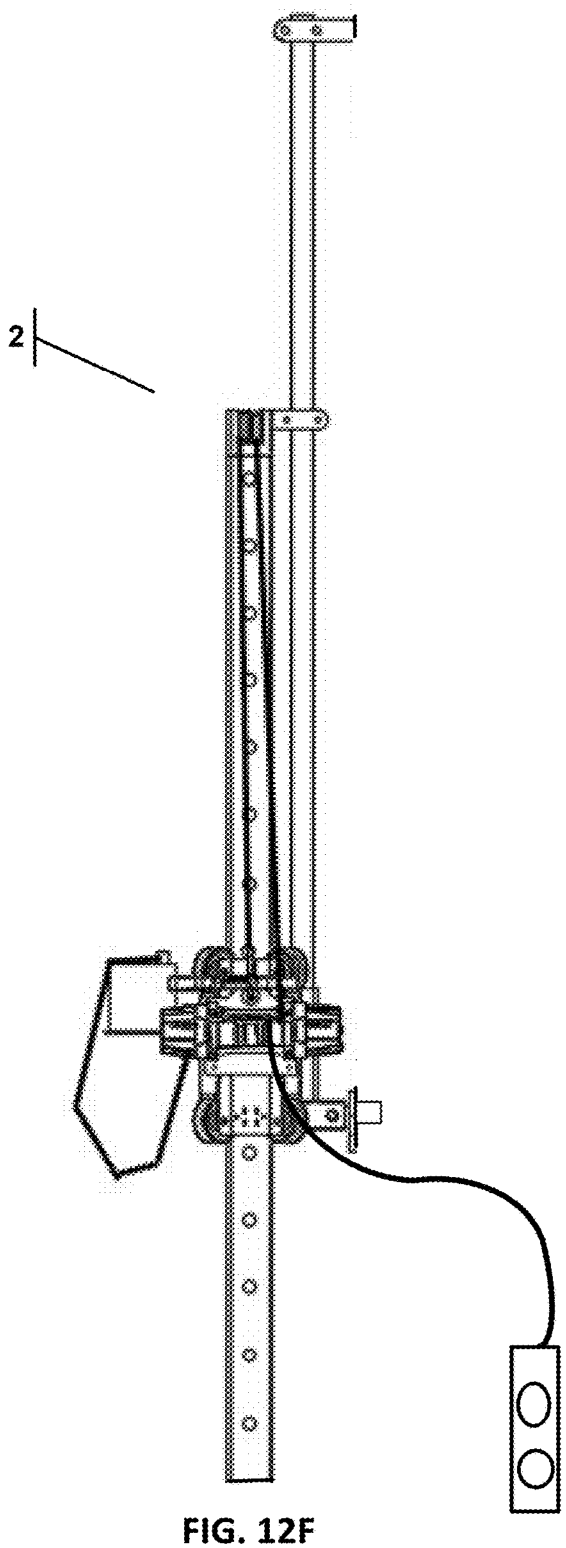
FIG. 12F is a side view of the lifting device with the carriage/trolley traveling up the carriage/trolley vertical member.
Figure 13:
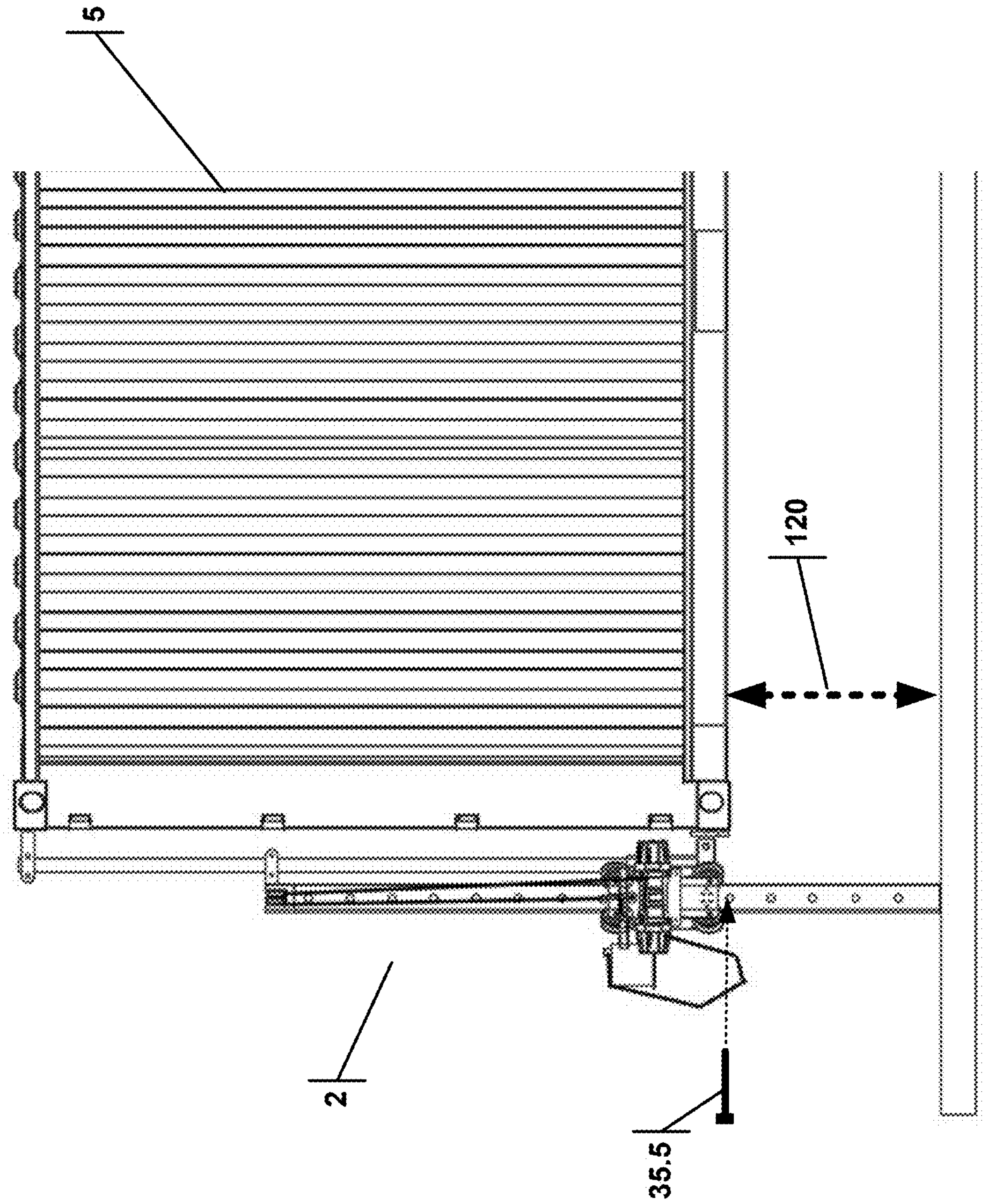
FIG. 13 is a side view illustrating the lifting of the container by the device.

While FIG. 12F omits the container 5 to more clearly and succinctly show the movement of the trolley/carriage 20 and vertical stabilization guide member 25, in FIG. 13 the same position of the lift device 2 is shown along with the container 5. FIG. 13 demonstrates the lifting of the container 5 by the lift device 2. The bottom end 35.1 of the carriage/trolley vertical member 35 is flush with the ground, and the container lift distance 120 is approximate to a particular distance corresponding to a hole 35.4 height off the ground. It is disclosed in FIG. 13 that a safety pin 35.5 may be inserted into the top hole 35.4 on the carriage/trolley vertical member 35 cleared by the carriage/trolley 20 as a matter of safety procedure. Such a step can prevent several dangerous or unsafe conditions, such as if the battery 105 is too low on charge and fails the system mid-lift; a safety pin 35.5 in the right position can prevent a dangerous drop of the container 5.

Figure 14A:
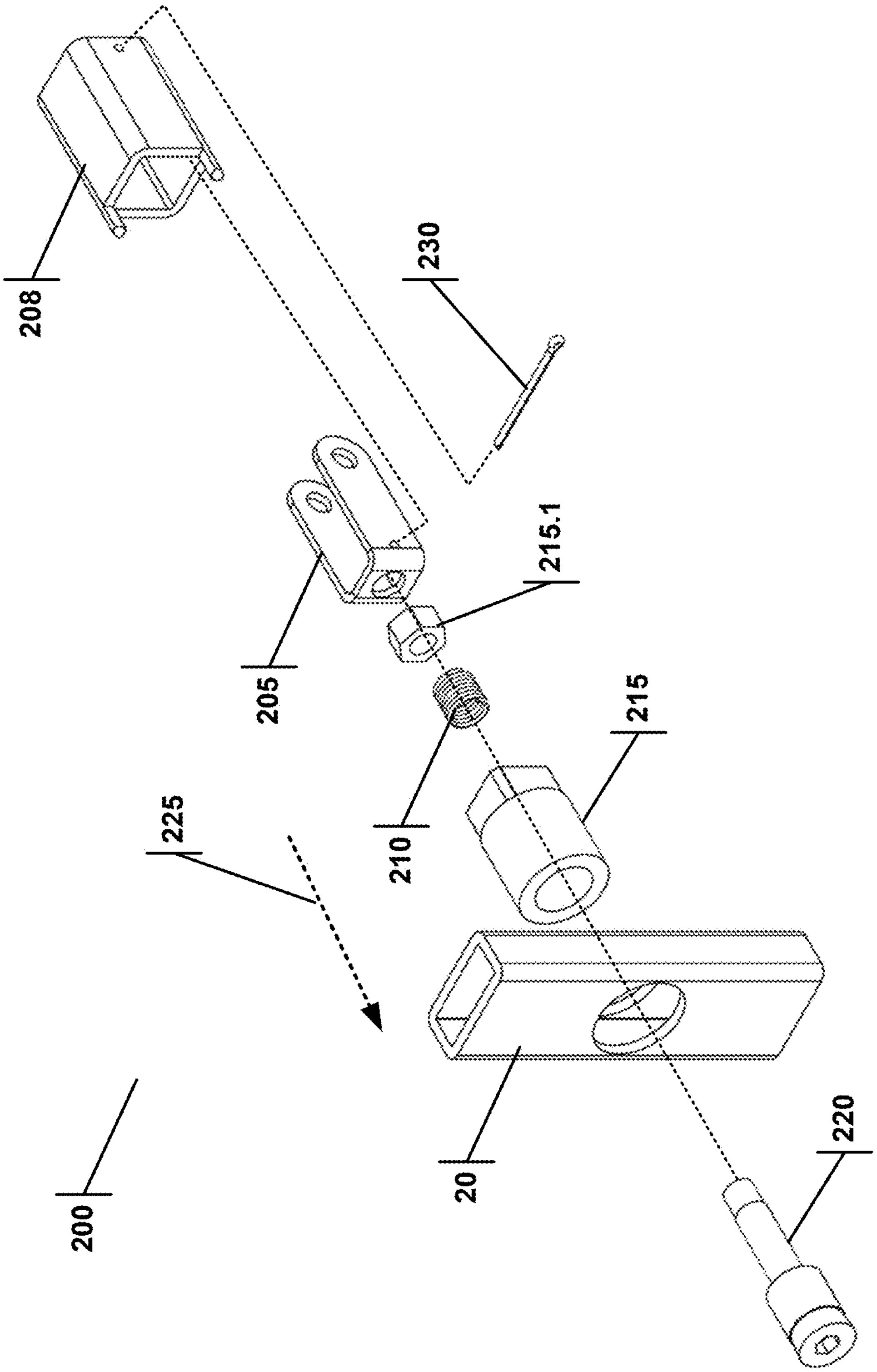
FIG. 14A is an exploded view of an emergency brake assembly.

Provided in FIGS. 14A-14G is an emergency brake assembly that may be used to prevent the carriage/trolley from inadvertently falling. FIG. 14A illustrates an exploded view of the emergency brake assembly 200 with a pulley bracket 205 that holds an emergency brake pulley 235 (shown in FIGS. 14B and 14C). The bracket 205 is connected to a retention shaft/pin 220 that inserts into the retention structures 35.4 (shown in FIGS. 14C and 14E) on the carriage/trolley vertical member 35. Alternatively, the retention structures 35.4 may be a bump such that when the retention shaft/pin 220 pushes against the carriage/trolley vertical member 35, the retention structures 35.4 prevent further vertical movement. A spring 210 along with the spring seat 215, 215.1 bias the retention shaft/pin 220 in the direction of arrow 225 to lodge into (or against) the retention structures 35.4. A shroud 208 may be used to cover the retention shaft/pin 220, spring 210, and spring seat 215, 215.1, such that nothing interferes with the emergency brake assembly 200 operation. A cotter pin 230 may be used to fix the shroud 208 and the pulley bracket 205. The spring seat 215 also seats the emergency brake assembly 200 to the carriage/trolley 20.

Figure 14B:
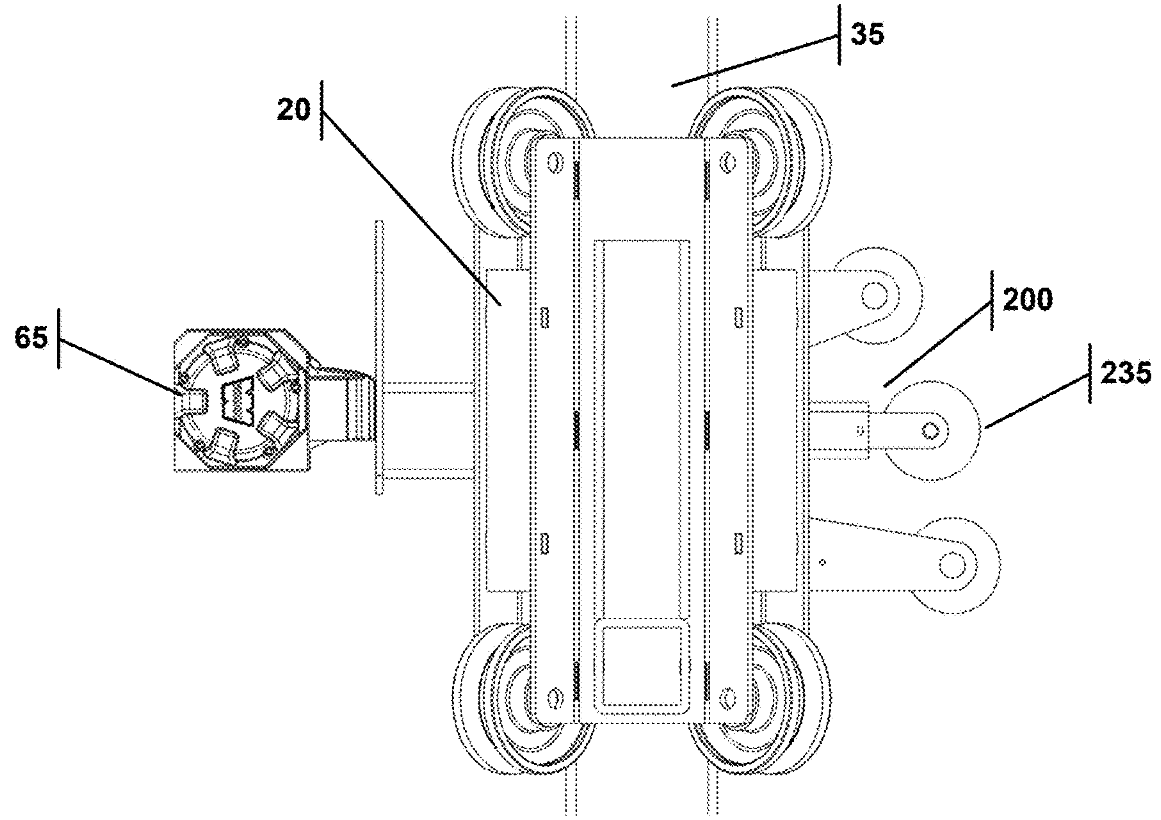
FIG. 14B is a side view of the emergency brake assembly installed on the carriage.
Figure 14C:
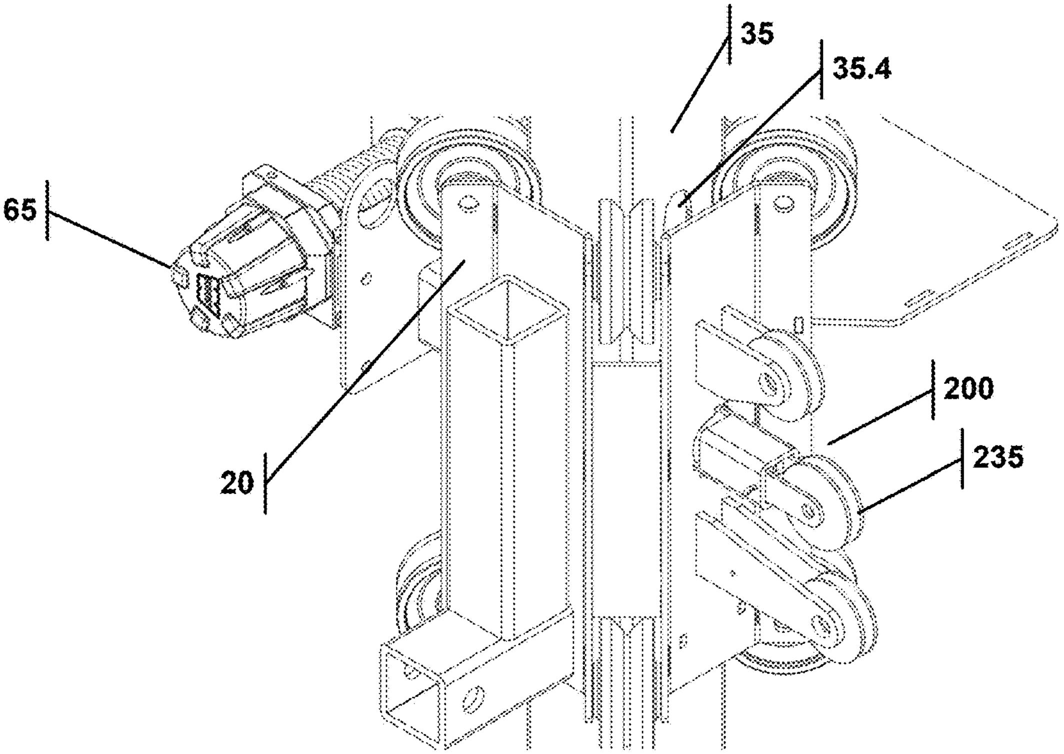
FIG. 14C is an isometric side view of the emergency brake assembly installed on the carriage.
Figure 14D:
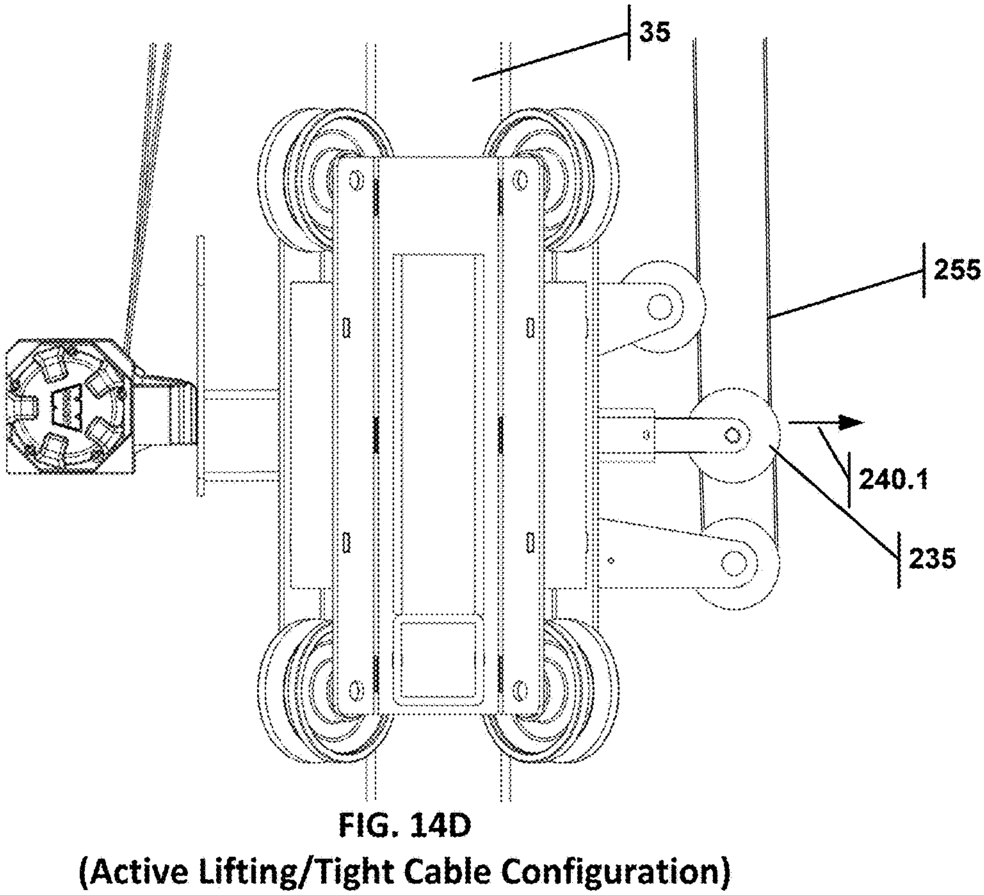
FIG. 14D is a side view of the carriage with the emergency brake during active lifting.
Figure 14E:
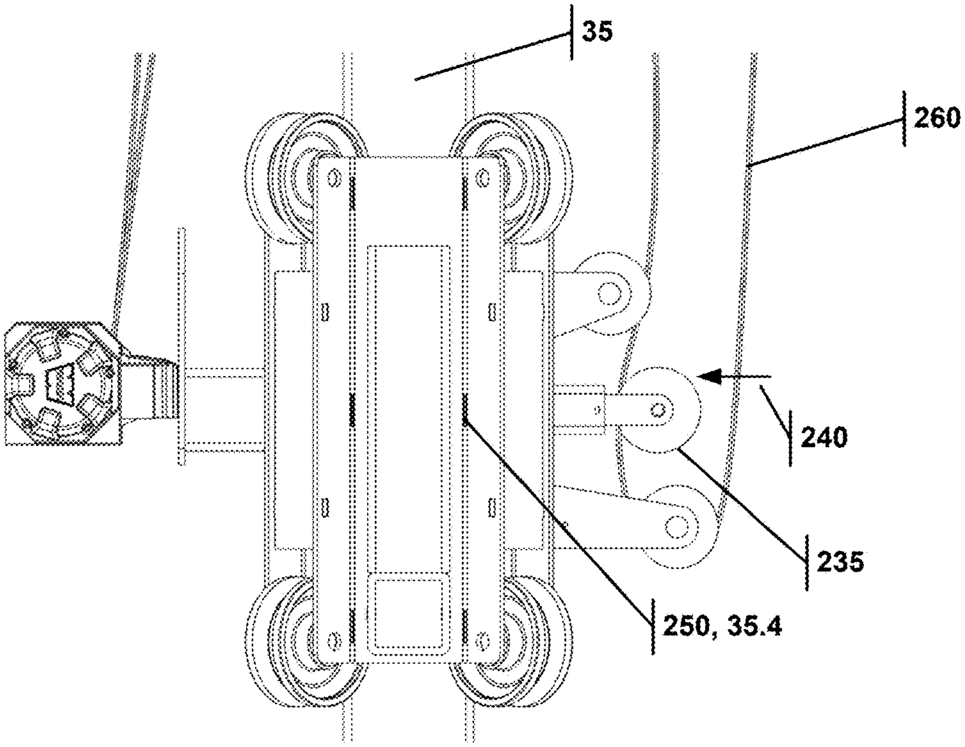
FIG. 14E is a side view of the carriage with the emergency brake when lifting has ceased or during an unexpected cable break.
Figure 14F:
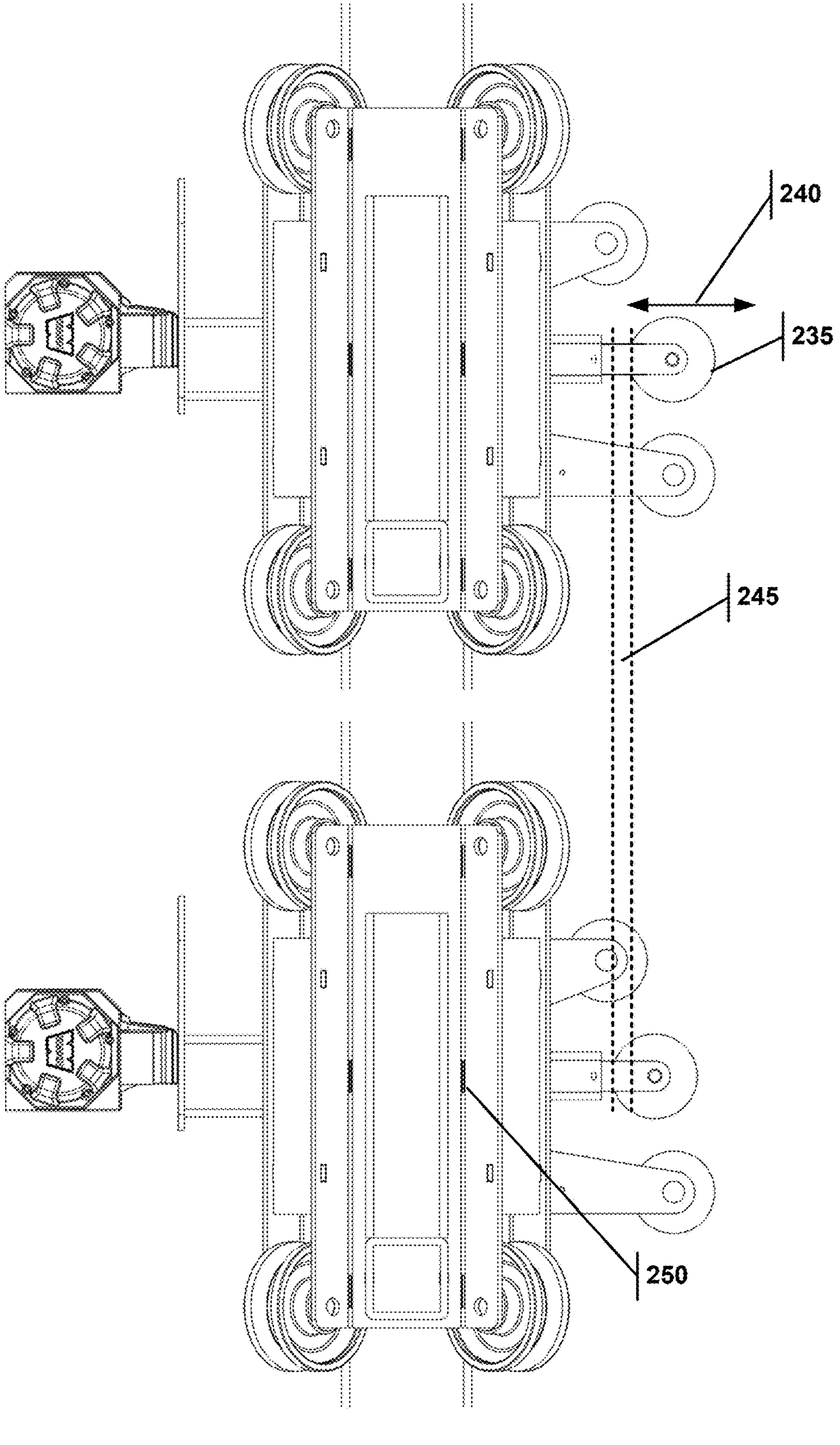
FIG. 14F compares the position of the emergency brake pulley during active lifting shown in FIG. 14D to the position when lifting has ceased or during an unexpected cable break shown in FIG. 14E.
Figure 14G:
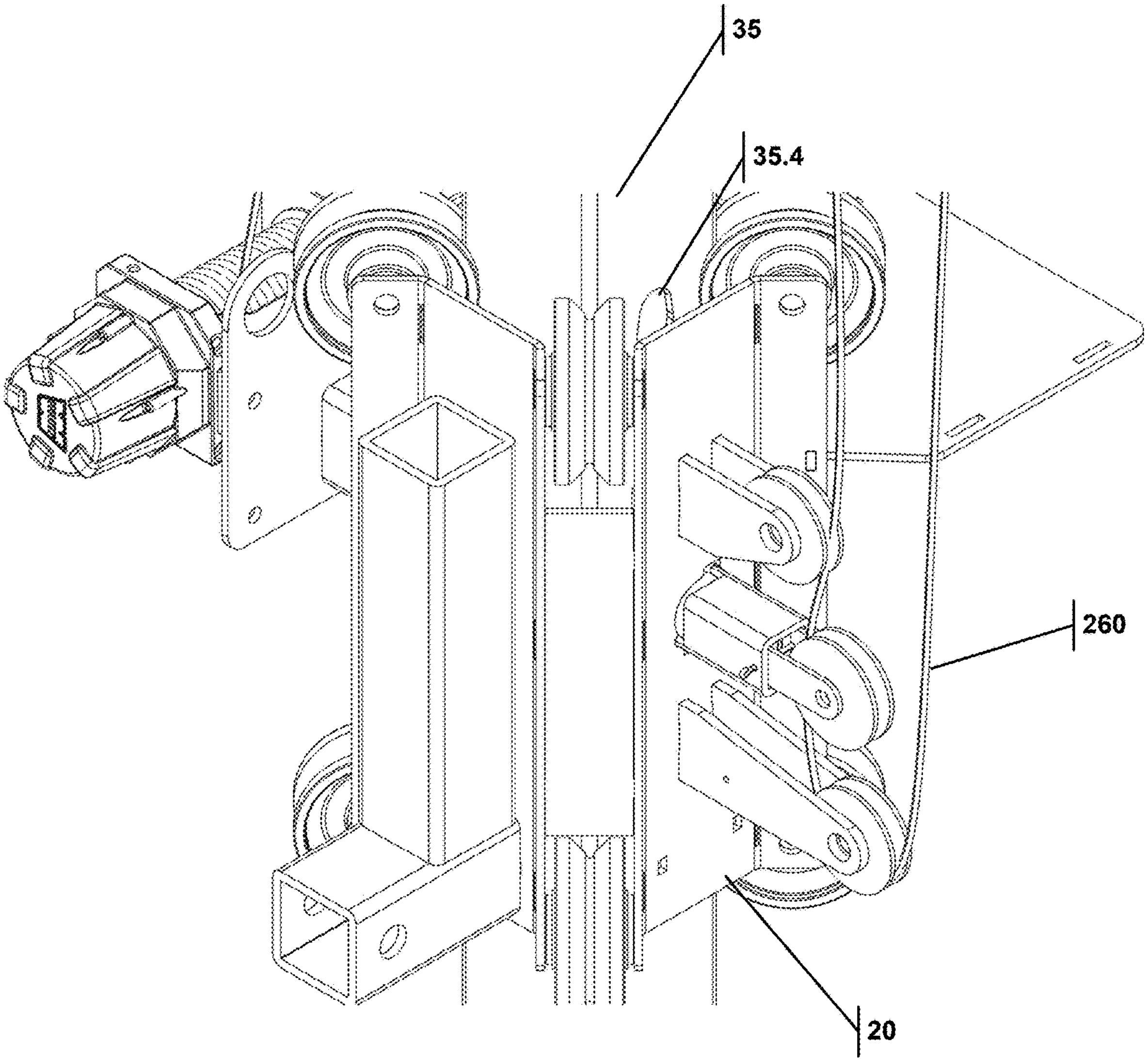
FIG. 14G is an isometric side view of the carriage/trolley with the emergency brake when lifting has ceased or during an unexpected cable break.

FIGS. 14B and 14C show the emergency brake assembly 200, along with an emergency brake pulley 235, installed on a carriage/trolley 20. In FIG. 14D, the carriage/trolley 20 is shown during active lifting, wherein the emergency brake assembly 200 is in the tight cable configuration. Because the cable is tight 255, it pulls the emergency brake pulley 235 and the retention shaft/pin in the direction of arrow 240.1; thereby pulling the retention shaft/pin out of the hole of the carriage/trolley vertical member 35, allowing the carriage/trolley 20 to slide up. If the winch stops pulling on the cable, or the cable breaks, it will become slack as shown in FIG. 14E, resulting in the emergency brake assembly 200 transitioning into the slack cable configuration. A slack cable 260 allows the spring within the emergency brake assembly to bias the retention shaft/pin in the direction of arrow 240, thereby forcing the retention shaft/pin into the hole 35.4 of the carriage/trolley vertical member 35 (shown as engagement point 250). FIG. 14F compares the position of the emergency brake pulley 235 during active lifting shown in FIG. 14D to the position when lifting has ceased or during an unexpected cable break shown in FIG. 14E. The range of movement for the emergency brake pulley 235 is shown by reference number 245. FIG. 14G is another view of the carriage/trolley 20 with the emergency brake assembly 200 when lifting has ceased or during an unexpected cable break.

Figure 15A:
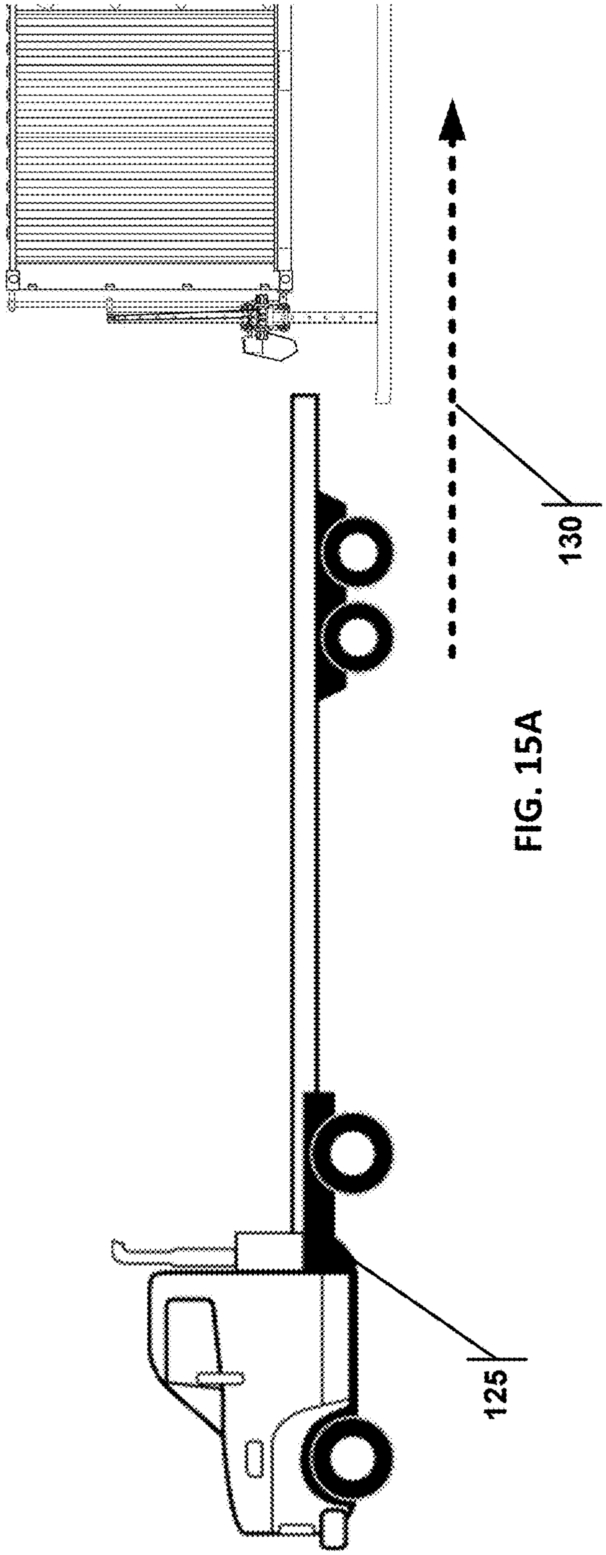
FIG. 15A is a side view illustrating the lifting of the container by the device and a flatbed truck positioned to travel underneath the lifted container.
Figure 15B:
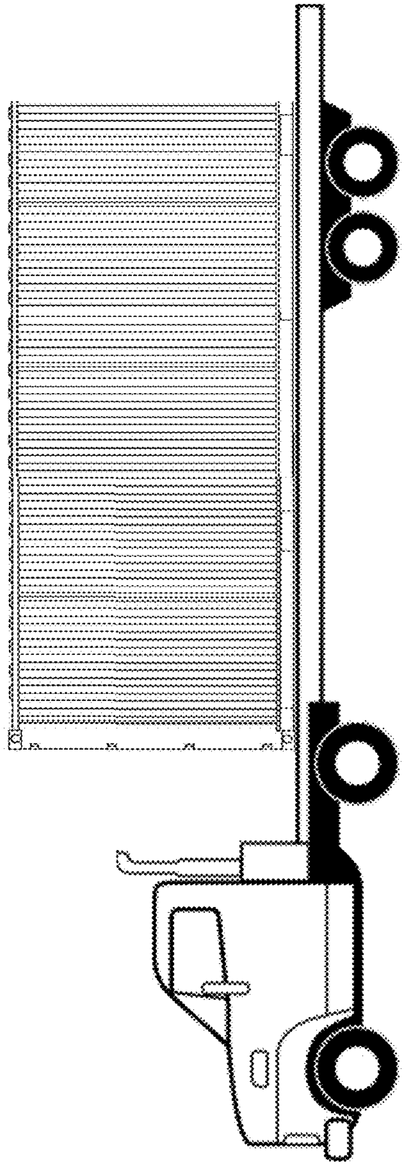
FIG. 15B is a side view illustrating the container loaded on the flatbed truck.

FIG. 15A provides a side view illustrating the lifting of the container by the lift device to achieve a container lift distance higher than the height of the truck's flatbed. The truck loading movement 130 is delineated by the arrow, which indicates that the flatbed truck 125 may reverse so that the flatbed is underneath the lifted container, and the lifted container may be safely lowered to rest on the bed of the truck 125. FIG. 15B then shows the container after it has been loaded on the flatbed truck. As an option, the lift device may be transported along with the container.

While this document contains many specifics, these should not be construed as limitations on the scope of any invention or of what may be claimed, but rather as descriptions of features that may be specific to a particular embodiment of the invention. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

The invention claimed is:

1. A lift device (2) for lifting a container (5) with a corner mounting block (10), the device (2) comprising:

a mount insert (15) constructed to insert into and lock with the corner mounting block (10);

a carriage/trolley (20) attached to the mount insert (15), the carriage/trolley comprising:

a frame (20.1) that defines a passthrough (20.2);

a plurality of guide wheels (20.3) attached to the frame (20.1) that extend into the passthrough (20.2); and a lower pulley (80) attached to the frame (20.1);

a carriage/trolley vertical member (35) disposed in the passthrough (20.2), the carriage/trolley vertical member (35) comprising:

a bottom end (35.1) constructed to contact the ground;

a first upper pulley (75) positioned away from the bottom end (35.1); and a second upper pulley (85) positioned away from the bottom end (35.1); and a winch (65) comprising a cable (70), wherein the cable (70) exits the winch, spools on the first upper pulley (75), spools on the lower pulley (80), spools on the second upper pulley (85), and connects to a cable anchor (90);

wherein the plurality of guide wheels (20.3) ride along the carriage/trolley vertical member (35).

2. The lift device (2) of claim 1, wherein the carriage/trolley vertical member (35) has a cross-section with a plurality of vertices (35.2), and each in the plurality of guide wheels (20.3) rides along each in the plurality of vertices (35.2).

3. The lift device (2) of claim 2, wherein each in the plurality of guide wheels (20.3) comprises a groove (20.4), and each in the plurality of vertices (35.2) is disposed in the groove (20.4).

4. The lift device (2) of claim 1, further comprising a winch mounting plate (55) that supports the winch (65).

5. The lift device (2) of claim 4, wherein the winch mounting plate (55) is in a fixed position relative to the carriage/trolley (20).

6. The lift device (2) of claim 1, wherein the cable anchor (90) is in a fixed position relative to the carriage/trolley (20).

7. The lift device (2) of claim 1, further comprising a battery (105) connected to the winch (65).

8. The lift device (2) of claim 7, wherein the battery (105) is in a fixed position relative to the carriage/trolley (20).

9. The lift device (2) of claim 1, wherein the winch (65) further comprises a remote control (115).

10. The lift device (2) of claim 1, further comprising:

a vertical stabilization guide member (25) attached to the container (5); and a pulley member bracket (50) that slidably attaches the carriage/trolley vertical member (35) to the vertical stabilization guide member (25).

11. The lift device (2) of claim 1, wherein the bottom end (35.1) of the carriage/trolley vertical member (35) comprises a flange (35.3).

12. The lift device (2) of claim 1, wherein the carriage/trolley vertical member (35) comprises a retention structure (35.4).

13. The lift device (2) of claim 12, wherein the retention structure (35.4) is constructed to receive a pin (35.5).

14. The lift device of claim 1, wherein the first upper pulley (75) comprises a plurality of pulleys.

15. The lift device of claim 1, wherein the second upper pulley (85) comprises a plurality of pulleys.

16. The lift device of claim 1, wherein the lower pulley (80) comprises a plurality of pulleys.

17. The lift device of claim 1, further comprising:

an emergency brake assembly (200) connected to the carriage/trolley (20) comprising:

a retention shaft/pin (220) constructed to move (1) towards the carriage/trolley vertical member (35) and engage with the retention structure (35.4), and (2) away from the carriage/trolley vertical member (35) and disengage with the retention structure (35.4);

an emergency brake pulley (235) connected to the retention shaft/pin (220);

a spring (210) exerting a bias force on the retention shaft/pin (220) towards the carriage/trolley vertical member (35);

wherein the cable (70) contacts the emergency brake pulley (235).

18. The lift device of claim 17, wherein the emergency brake assembly (200) comprises two configurations:

a tight cable configuration wherein the cable (70) exerts a force on the emergency brake pulley (235) greater than the spring bias force, thereby moving the retention shaft/pin (220) away from the carriage/trolley vertical member (35) and disengaging the retention shaft/pin (220) from the retention structure (35.4), allowing the carriage/trolley (20) movement along the carriage/trolley vertical member (35); and a slack cable configuration wherein the spring (210) exerts a force on the retention shaft/pin (220) greater than the force the cable (70) exerts on the emergency brake pulley (235), thereby moving the retention shaft/pin (220) towards the carriage/trolley vertical member (35) and engaging the retention shaft/pin (220) with the retention structure (35.4), preventing the carriage/trolley (20) movement along the carriage/trolley vertical member (35).

19. A lift device (2) for lifting a container (5) with a corner mounting block (10), the device (2) comprising:

a carriage/trolley (20) comprising:

a frame (20.1) that defines a passthrough (20.2);

a plurality of guide wheels (20.3) attached to the frame (20.1) that extend into the passthrough (20.2);

a carriage/trolley vertical member (35) disposed in the passthrough (20.2), the carriage/trolley vertical member (35) comprising a retention structure (35.4) and an upper pulley (75);

a cable (70) that spools on the upper pulley (75) and connects to the carriage/trolley (20);

an emergency brake assembly (200) connected to the carriage/trolley (20) comprising:

a retention shaft/pin (220) constructed to move (1) towards the carriage/trolley vertical member (35) and engage with the retention structure (35.4), and (2) away from the carriage/trolley vertical member (35) and disengage with the retention structure (35.4);

an emergency brake pulley (235) connected to the retention shaft/pin (220);

a spring (210) exerting a bias force on the retention shaft/pin (220) towards the carriage/trolley vertical member (35);

wherein the cable (70) contacts the emergency brake pulley (235).

20. The lift device of claim 19, wherein the emergency brake assembly (200) comprises two configurations:

a tight cable configuration wherein the cable (70) exerts a force on the emergency brake pulley (235) greater than the spring bias force, thereby moving the retention shaft/pin (220) away from the carriage/trolley vertical member (35) and disengaging the retention shaft/pin (220) from the retention structure (35.4), allowing the carriage/trolley (20) movement along the carriage/trolley vertical member (35); and a slack cable configuration wherein the spring (210) exerts a force on the retention shaft/pin (220) greater than the force the cable (70) exerts on the emergency brake pulley (235), thereby moving the retention shaft/ pin (220) towards the carriage/trolley vertical member (35) and engaging the retention shaft/pin (220) with the retention structure (35.4), preventing the carriage/trolley (20) movement along the carriage/trolley vertical member (35).

* * * * *